United States Patent
Lim et al.

(10) Patent No.: US 10,319,151 B2
(45) Date of Patent: Jun. 11, 2019

(54) DEVICE AND METHOD FOR HIERARCHICAL OBJECT RECOGNITION

(71) Applicant: MOTOROLA SOLUTIONS, INC., Chicago, IL (US)

(72) Inventors: Bing Qin Lim, Jelutong (MY); Teik Kean Khoo, Bagan Serai (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/643,789

(22) Filed: Jul. 7, 2017

(65) Prior Publication Data
US 2019/0012836 A1    Jan. 10, 2019

(51) Int. Cl.
| G06F 3/01 | (2006.01) |
|---|---|
| G06T 19/00 | (2011.01) |
| G06F 12/08 | (2016.01) |
| G02B 27/01 | (2006.01) |
| G06T 7/70 | (2017.01) |
| G06K 9/00 | (2006.01) |
| G06K 9/20 | (2006.01) |

(52) U.S. Cl.
CPC .......... *G06T 19/006* (2013.01); *G02B 27/017* (2013.01); *G06F 3/013* (2013.01); *G06F 12/08* (2013.01); *G06K 9/00604* (2013.01); *G06K 9/00671* (2013.01); *G06K 9/2081* (2013.01); *G06T 7/70* (2017.01); *G02B 2027/014* (2013.01); *G02B 2027/0138* (2013.01)

(58) Field of Classification Search
CPC .............................. G06F 3/013; G02B 27/017
USPC .......................................................... 345/633
See application file for complete search history.

(56) References Cited

U.S. PATENT DOCUMENTS

| 7,239,929 B2 | 7/2007 | Ulrich et al. |
|---|---|---|
| 7,990,422 B2 | 8/2011 | Ahiska et al. |
| 8,335,345 B2 | 12/2012 | White et al. |
| 2011/0063446 A1 | 3/2011 | McMordie et al. |
| 2014/0168056 A1 | 6/2014 | Swaminathan et al. |
| 2014/0241617 A1 | 8/2014 | Shotton et al. |

(Continued)

OTHER PUBLICATIONS

Schmidt, Greg, et al. "Toward disambiguating multiple selections for frustum-based pointing." 3D User Interfaces, 2006. 3DUI 2006. IEEE Symposium on. IEEE, 2006.

(Continued)

*Primary Examiner* — Thomas J Lett
(74) *Attorney, Agent, or Firm* — Perry + Currier, Inc.

(57) ABSTRACT

A device and method for hierarchical object recognition is provided. The device comprises: an augmented reality display device including a camera, a display device, and an eye-tracking device; an input device; a memory storing a hierarchical object recognition library arranged in a plurality of levels; and a controller. The controller receives, using the input device, an indication of a selected level of the hierarchical object recognition library. The controller determines, using the eye-tracking device, an eye-gaze direction. The controller recognizes at least one object in an image from the camera in the eye-gaze direction by comparing at least a region of the image in the eye-gaze direction with the selected level of the hierarchical object recognition library. The controller controls the display device to indicate a recognized object in the eye-gaze direction.

18 Claims, 16 Drawing Sheets

(56) References Cited

U.S. PATENT DOCUMENTS

2015/0049113 A1    2/2015   Rahman et al.
2015/0135128 A1    5/2015   Ren
2015/0138211 A1    5/2015   Ren
2015/0338915 A1*  11/2015   Publicover .............. G06F 21/64
                                                         345/633

OTHER PUBLICATIONS

ISA/EP, International Search Report and Written Opinion, dated Sep. 27, 2018, re PCT International Patent Application No. PCT/US2018/038219.

* cited by examiner

DEVICE AND METHOD FOR HIERARCHICAL OBJECT RECOGNITION

BACKGROUND OF THE INVENTION

First responders often use augmented reality devices to select objects in images using object recognition technique (e.g. video analytics), in order to identify the objects in reports, communications, and the like. When the augmented reality devices are wearable, eye gaze may be used to select objects. Such object recognition generally includes identification of an entire object only, for example an automobile. However, often the objects of interest to the first responders are only sections of the entire objects, for example, a fender of an automobile. Hence, once the entire object is identified, for example, in an image, the image is generally generated, and the portion of the entire object is manually highlighted, which is generally a waste of processing resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
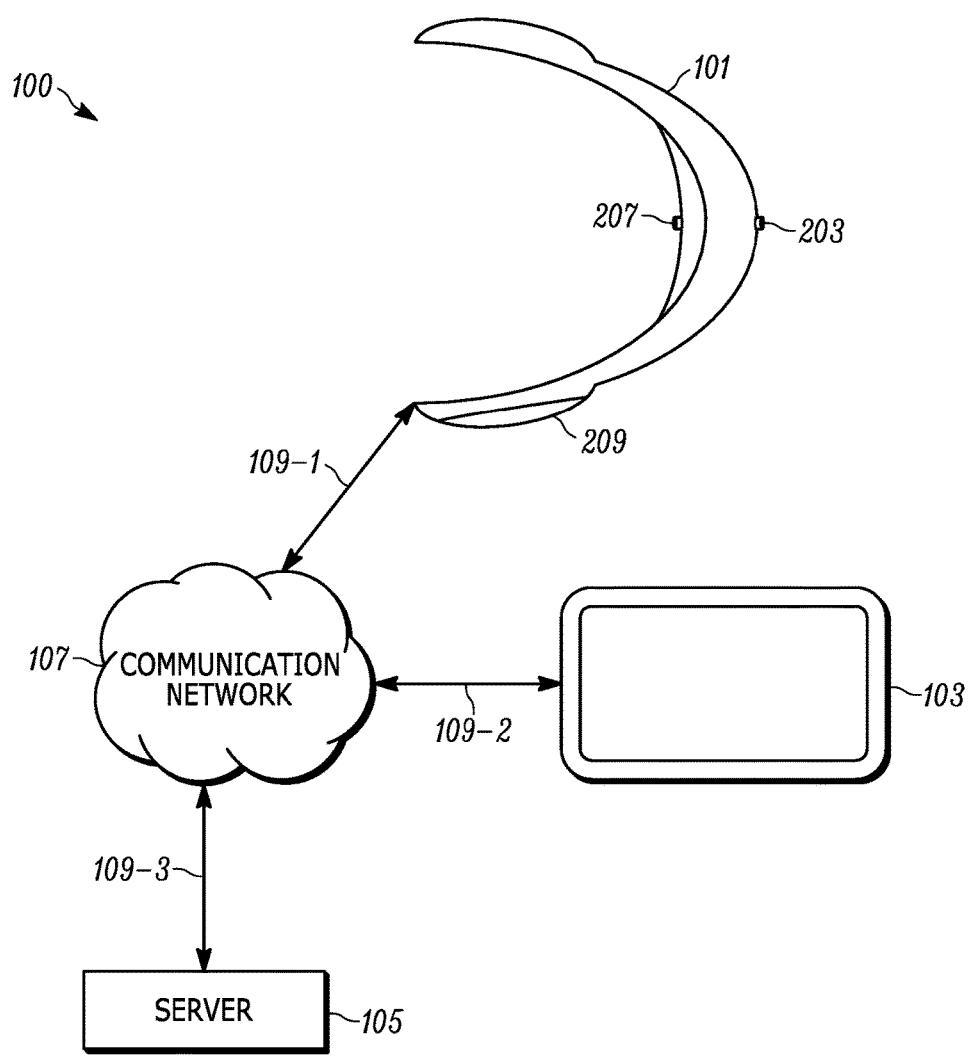
FIG. 1 is a block diagram of a system for hierarchical object recognition in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: an augmented reality display device including a camera, a display device, and an eye-tracking device; an input device; a memory storing a hierarchical object recognition library arranged in a plurality of levels; and a controller configured to: receive, using the input device, an indication of a selected level of the hierarchical object recognition library; determine, using the eye-tracking device, an eye-gaze direction; recognize at least one object in an image from the camera in the eye-gaze direction by comparing at least a region of the image in the eye-gaze direction with the selected level of the hierarchical object recognition library; and control the display device to indicate a recognized object in the eye-gaze direction.

Another aspect of the specification provides a method comprising: at a device comprising: an augmented reality display device including a camera, a display device, and an eye-tracking device; an input device; a memory storing a hierarchical object recognition library arranged in a plurality of levels; and a controller, receiving, using the input device, an indication of a selected level of the hierarchical object recognition library; determining, using the eye-tracking device, an eye-gaze direction; recognizing, using the controller, at least one object in an image from the camera in the eye-gaze direction by comparing at least a region of the image in the eye-gaze direction with the selected level of the hierarchical object recognition library; and controlling, using the controller, the display device to indicate a recognized object in the eye-gaze direction.

Yet a further aspect of the specification provides a device comprising: a display device; an input device; a memory storing a hierarchical object recognition library arranged in a plurality of levels; and a controller communicatively coupled to the display device, the input device, and the memory, the controller configured to: receive an image including a plurality of objects; receive, using the input device, an indication of a selected level of the hierarchical object recognition library; determine an eye-gaze direction; recognize at least one of the objects in the image by comparing at least a region of the image in the eye-gaze direction with the selected level of the hierarchical object recognition library; and control the display device to indicate a recognized object in the eye-gaze direction.

Yet a further aspect of the specification provides a method comprising: at a display device comprising: an input device; a memory storing a hierarchical object recognition library arranged in a plurality of levels; and a controller communicatively coupled to the display device, the input device, and the memory, receiving, using the controller, an image including a plurality of objects; receiving, using the input device, an indication of a selected level of the hierarchical object recognition library; determining, using the controller, an eye-gaze direction; recognizing, using the controller, at least one of the objects in the image by comparing at least a region of the image in the eye-gaze direction with the selected level of the hierarchical object recognition library; and controlling, using the controller, the display device to indicate a recognized object in the eye-gaze direction.

FIG. 1 is a block diagram of a system 100 that includes a device 101 (depicted in a top view), a communication device 103 and a server 105 configured to communicate with each other using at least one communication network 107 using respective communication links 109-1, 109-2, 109-3 with the at least one communication network 107. For simplicity, the communication device 103 will be interchangeably referred to hereafter as the device 103, the at least one communication network 107 will be interchangeably referred to hereafter as the network 107, and the communication links 109-1, 109-2, 109-3 will be interchangeably referred to hereafter, collectively, as the links 109 and, generically as a link 109.

As will be described in further detail below, the device 101 is generally configured to acquire images and provide the images to the device 103 using the links 109-1, 109-2, for example for use in a report and/or a communication, which is provided to the server 105 using the links 109-2, 109-3. Alternatively, the device 101 may provide acquired images to the server 105 without providing the images to the device 103.

The device 103 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cell-phones, smartphones, e-readers, mobile camera devices and the like. However, other suitable devices are within the scope of present embodiments including non-mobile radios and non-mobile communication devices. Furthermore, the device 103 may be incorporated into vehicles, and the like (for example emergency service vehicles), as a radio, an emergency radio, and the like.

Indeed, in some embodiments, the device 103 is specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

While not described in detail, it is assumed that the device 103 generally comprises a controller interconnected with a display device, at least one input device, a memory and a communication interface.

The server 105 generally comprises a computing device and/or a communication device which may be used to communicate with a plurality of devices similar to the devices 101, 103, for example to store and/or collate and/or organize images and/or reports from first responders (interchangeably referred to as emergency responders). For example, the server 105 may be associated with, and/or operated by, one or more entities that deploy and/or manage first responders, for example, a police services entity (e.g. a police department), a fire services entity (e.g. a fire department), a paramedical services entity (e.g. a hospital and/or an ambulance services entity), and the like. While not described in detail, it is assumed that the server 105 generally comprises a controller interconnected with a memory and a communication interface, and optionally a display device and at least one input device.

While present embodiments of the device 101 and/or the system 100 are described with reference to first responders, the device 101 and/or the system 100 may be implemented with other types of users, including, but not limited, to consumers and/or enterprise users. In these embodiments, at least the device 101 comprises a consumer-grade device and/or an enterprise-grade device, as are the device 103 and the server 105. Furthermore, the device 103 and/or the server 105 may be optional.

The network 107 comprises any suitable combination of wired and/or wireless networks that enables the devices 101, 103, and the server 105, to communicate, including, but not limited to, a local network, for example between the devices 101,103 (including, but not limited to a Bluetooth™ network, and the like), the internet, a packet-based network, a WiFi network, a cell phone network, and the like. Indeed, radios and/or network interfaces and/or communication interfaces at each of the devices 101, 103, and the server 105, generally correspond to technologies used to communicate with the network 107. Indeed, the links 109-1, 109-2 may, in some embodiments, comprise wireless links, including, but not limited to Bluetooth™ links, while the link 109-3 may, in some embodiments, comprise a combination of wireless and wired links.

With reference to both FIG. 1 and FIG. 2, which depicts a block diagram of the device 101, the device 101 comprises: an augmented reality display device 201 including a camera 203, a display device 205, and an eye-tracking device 207; an input device 209; a memory 212 storing a hierarchical object recognition library 214 arranged in a plurality of levels (described in further detail below); and a controller 220 configured to: receive, using the input device 209, an indication of a selected level of the hierarchical object recognition library 214; determine, using the eye-tracking device 207, an eye-gaze direction; recognize at least one object in an image from the camera 203 in the eye-gaze direction by comparing at least a region of the image in the eye-gaze direction with the selected level of the hierarchical object recognition library 214; and control the display device 205 to indicate a recognized object in the eye-gaze direction.

As depicted, the device 101 further comprise a communication interface 224 (interchangeably referred to hereafter as the interface 224) configured to communicate with one or more of the device 103 and the server 105. Furthermore, the memory 212 stores an application 230, described in further detail below. The controller 220 is generally in communication with the camera 203, the display device 205 and the eye-tracking device 207 of the augmented reality device 201, the input device 209, the memory 212, and the interface 224.

Figure 3:
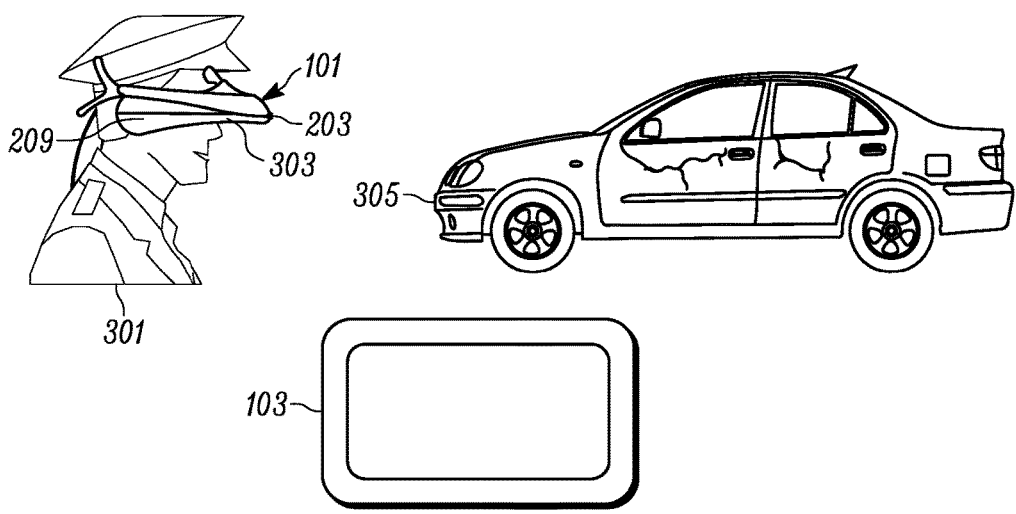
FIG. 3 depicts the device of FIG. 2 being worn by a first responder in accordance with some embodiments.

Attention is next directed to FIG. 3, which depicts the device 101 being used and/or worn by a user, as depicted, a first responder 301, including, but not limited to a police officer, and the like. Hence, as depicted, the device 101 is generally configured as a wearable device, for example as a heads-up display device and/or an augmented reality device used by first responders to recognize objects in images for generation of reports, communications, and the like. As such, the device 101 further comprises a housing 303 which is wearable by the first responder 301, for example in a manner similar to glasses and the like.

As depicted, the device 103 is being used by the first responder 301 wearing the device 101 and further using the device 103, to collate information in a report being generated by the device 103, the report to be provided to the server 105. In particular, the camera 203 is mounted in a forward-facing direction (e.g. away from the first responder 301) such that images acquired by the camera 203 generally correspond to a direction in which the first responder 301 is looking with their eyes. In particular, as depicted, the first responder 301 is looking at a vehicle 305 that has been damaged, and hence the first responder 301 is to acquire images of the vehicle 305 and generate a report.

Furthermore, while not visible in FIG. 3, it is understood that the display device 205 of the device 101 is generally mounted such that the display device 205 is viewable by the first responder 301, and that images acquired by the camera 203, and/or augmented images, may be provided and/or rendered and/or displayed at the display device 205 such that the first responder 301 may view the environment in a forward-facing direction using the display device 205 in an augmented fashion.

While the eye-tracking device 207 is also not visible in FIG. 3 (however, see FIG. 1), the eye-tracking device 207 is generally mounted in a direction opposite to that of the camera 203 such that the eye-tracking device 207 is facing in a direction of the eyes of the first responder 301. As such the eye-tracking device 207 may determine an eye-gaze direction of the first responder 301 and the images acquired by the camera 203 may be used to augment images provided at the display device 205 depending on the eye-gaze direction. Put another way, the eye-tracking device 207 may be used by the controller 220 to determine an eye-gaze direction of the first responder 301, and the images acquired by the camera 203 may be used to augment objects in the eye-gaze direction at the display device 205.

Returning to FIG. 2, the camera 203 generally comprises one or more camera devices and/or video devices configured to acquire electronic images, including, but not limited to, a charge-coupled device (CCD) camera, and the like.

Similarly, the eye-tracking device 207 comprises one or more sensors configured to determine an eye-gaze direction including, but not limited to, one or more cameras arranged to acquire images of eyes of a user (e.g. the first responder 301) using the device 101. The eye-tracking device 207 may further include one or more lights for illuminating the eyes of the user, including, but not limited to, light visible to the user and lights not visible to the user, such as infrared lights. In general, the one or more sensors configured to determine an eye-gaze direction are sensitive to light provided by the more lights for illuminating the eyes (when present).

The display device 205 comprises one or more display devices, for example, one display device for each eye of a user, or one display device viewable by both eyes of a user. Either way, the display device 205 comprises one or more of a cathode ray tube, a flat panel display, a liquid crystal display, an organic light emitting display, and the like.

In some embodiments, the display device 205 is generally transparent such that the first responder 301 may view the environment in a forward-facing direction through the display device 205, with a field-of-view of the camera 203 corresponding to the field-of-view of the first responder 301 through the display device 205. Hence, objects in each of the fields-of-view of the camera 203 and through the display device 205 may generally be in a similar position. As such, the controller 220 is generally configured to determine to recognize objects in images from the camera 203 and control the display device 205 to indicate the objects, for example, the indications including, but not limited to, one or more of outlines of the recognized objects, text, icons, and the like.

Alternatively, the display device 205 is generally not transparent such that the first responder 301 may view the environment in a forward-facing direction using images acquired by the camera 203 which are provided at the display device 205. The controller 220 controls the display device 205 to indicate the objects in the images, the indications including, but not limited to, one or more of outlines of the recognized objects, text, icons, and the like.

The input device 209 comprises any type of input device configured to receive an indication of a selected level of the hierarchical object recognition library 214, for example from a user of the device 101 (e.g. the first responder 301). As described herein, the input device 209 comprises a touch panel mounted on an external surface of the housing 303, for example, a side of the housing 303 where the touch panel is located at a side of the head of the first responder 301 when the device 101 is in use, such that the touch panel is touchable by a finger, and the like, of the first responder 301.

However, while the input device 209 is described herein with reference to a touch panel, the input device 209 may comprise any suitable input device that may be used to receive an indication of a selected level of the hierarchical object recognition library 214 including, but not limited to, a pointing device, and the like. Indeed, in some embodiments, the input device 209 may be combined with the camera 203, such that, for example, user-body-part positions (e.g. of a user's hand, finger and/or other body part) and/or user gestures detected using the camera 203 may be used to receive an indication of a selected level of the hierarchical object recognition library 214.

The controller 220 includes one or more logic circuits, one or more processors, one or more microprocessors, one or more ASIC (application-specific integrated circuits) and one or more FPGA (field-programmable gate arrays). In some embodiments, the controller 220 and/or the device 101 is not a generic controller and/or a generic device, but a device specifically configured to implement hierarchical object recognition functionality. For example, in some embodiments, the device 101 and/or the controller 220 specifically comprises a computer executable engine configured to implement specific functionality for implement hierarchical object recognition.

The memory 212 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 1, programming instructions (e.g., machine readable instructions) that implement the functional teachings of the device 101 as described herein are maintained, persistently, at the memory 212 and used by the controller 220 which makes appropriate utilization of volatile storage during the execution of such programming instructions.

Figure 2:
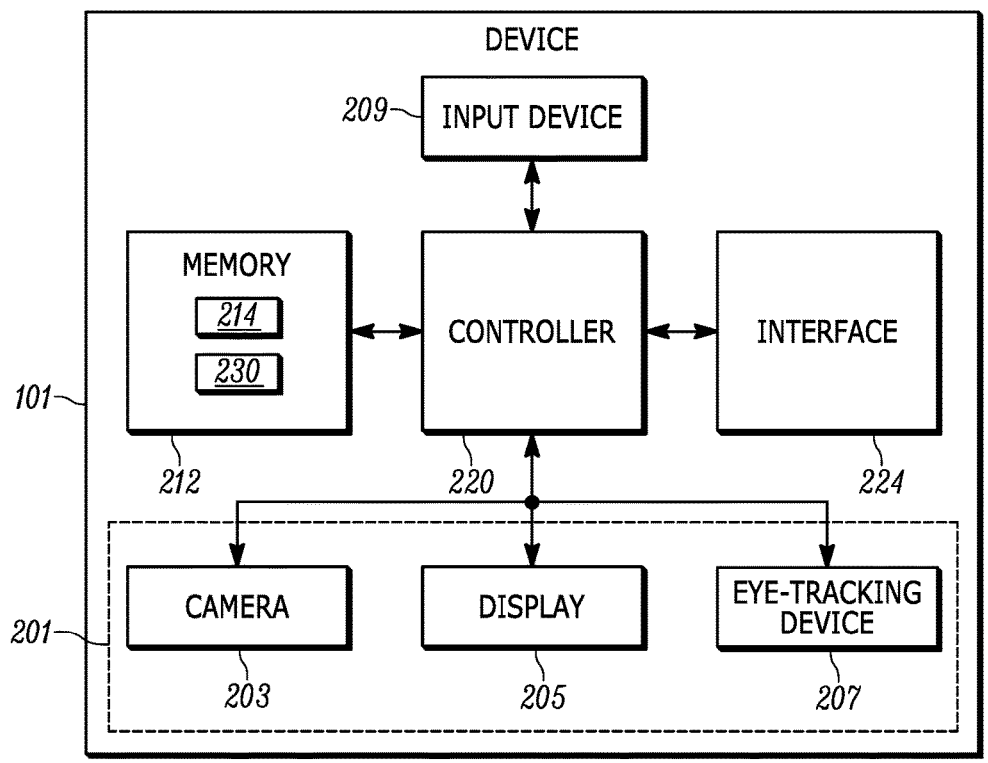
FIG. 2 is a block diagram of a device for hierarchical object recognition in accordance with some embodiments.

In particular, the memory 212 of FIG. 2 stores instructions corresponding to the application 230 that, when executed by the controller 220, enables the controller 220 to implement the hierarchical object recognition functionality associated with the application 230. In the illustrated example, when the controller 220 executes the application 230, the controller 220 is enabled to: receive, using the input device 209, an indication of a selected level of the hierarchical object recognition library 214; determine, using the eye-tracking device 207, an eye-gaze direction; recognize at least one object in an image from the camera 203 in the eye-gaze direction by comparing at least a region of the image in the eye-gaze direction with the selected level of the hierarchical object recognition library 214; and control the display device 205 to indicate a recognized object in the eye-gaze direction. As depicted, the device 101 further comprise a communication interface 224 (interchangeably referred to hereafter as the interface 224) configured to communicate with one or more of the device 103 and the server 105.

It is further assumed that the controller 220 is generally configured to recognize objects in images, for example objects in images from the camera 203, using any suitable technique and/or image processing technique including, but not limited to one or more edge detection techniques. For example, in edge detection techniques, boundaries between objects are detected by detecting changes and/or discontinuities in image brightness, color, and the like. Such edge detection techniques may include comparing images acquired by the camera 203 with the hierarchical object recognition library 214. For example, the controller 220 may use one or more edge detection techniques to detect objects in the images acquired by the camera 203, and compare the detected objects with the hierarchical object recognition library 214; when a match is found, the controller 220 determines that an object has been recognized; when a match is not found, the controller 220 determines that an object has not been recognized and may attempt to recognize a different object.

Similarly, the controller 220 may further, in some embodiments be configured to detect portions of objects in the images acquired by the camera 203 using any suitable technique and/or image processing technique including, but not limited to one or more edge detection techniques and/or comparing images acquired by the camera 203 with the hierarchical object recognition library 214.

The interface 224 is generally configured to communicate with the device 103 and/or the server 103 as desired, including, but not limited to, cables, WiFi links and the like. In other words, the link 109-1 may include any suitable combination of wired networks and/or wireless networks.

In some embodiments, the interface 224 is further configured to communicate with the device 103 and/or the server 105, including, but not limited to, using one or more communication channels over the links 109. In these embodiments, the interface is implemented by, for example, one or more radios and/or connectors and/or network adaptors, configured to communicate wirelessly, with network architecture that is used to implement one or more communication channels between the devices 101, 103 and the server 105. In these embodiments, the interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 224 includes one or more local area network or personal area network transceivers operating in accordance with an IEEE 902.11 standard (e.g., 902.11a, 902.11b, 902.11g), and/or a Bluetooth™ transceiver which may be used to communicate with the devices 103 and/or the server 105. In some embodiments, the interface 224 is further configured to communicate "radio-to-radio" on some communication channels (e.g. in embodiments where the interface 224 includes a radio), while other communication channels are configured to use wireless network infrastructure.

Example communication channels over which the interface 224 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 224 communicates with the device 103 using the server 105 and/or other communication devices, for example by communicating with the other servers and/or communication devices using, for example, packet-based and/or internet protocol communications, and the like, and the server 105 and/or the other servers and/or communication devices communicate with the device 103.

Indeed, communication between the devices 101, 103 and the server 105 may further include any suitable combination of wired networks and/or wireless networks. In other words, the links 109 may include any suitable combination of wired networks and/or wireless networks, including, but not limited to, the network 107.

Furthermore, while not depicted, it is assumed that device 101 includes a power source, including, but not limited to, a battery, a power pack, and the like.

It should be understood that a wide variety of configurations for the system 100 and/or the device 101 are within the scope of present embodiments.

Figure 4:
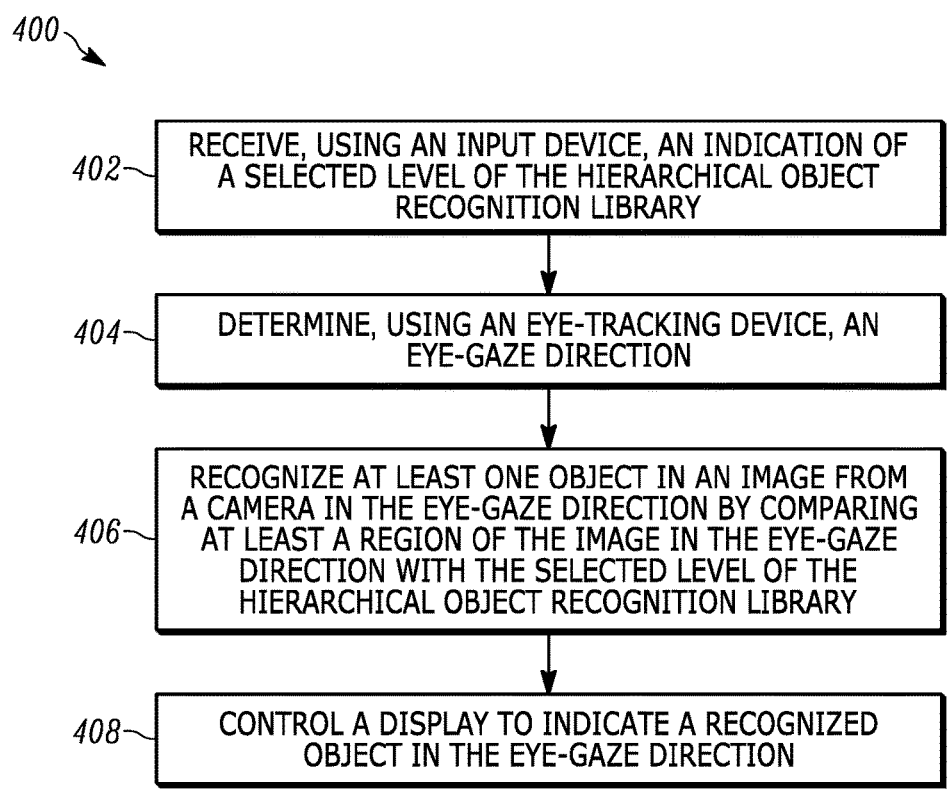
FIG. 4 is a flowchart of a method of hierarchical object recognition in accordance with some embodiments, in accordance with some embodiments.

Attention is now directed to FIG. 4 which depicts a flowchart representative of a method 400 for implementing hierarchical object recognition. In some embodiments, the operations of the method 400 of FIG. 4 correspond to machine readable instructions that are executed by, for example, the device 101, and specifically by the controller 220 of the device 101. In the illustrated example, the instructions represented by the blocks of FIG. 4 are stored at the memory 212, for example, as the application 230. The method 400 of FIG. 4 is one way in which the device 101 and/or the controller 220 is configured. Furthermore, the following discussion of the method 400 of FIG. 4 will lead to a further understanding of the device 101, and its various components.

However, it is to be understood that the system 100 and/or the device 101 and/or the controller 220 and/or the method 400 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 220 receives, using the input device 209, an indication of a selected level of the hierarchical object recognition library 214.

At a block 404, the controller 220 determines, using the eye-tracking device 207, an eye-gaze direction.

At a block 406, the controller 220 recognizes at least one object in an image from the camera 203 in the eye-gaze direction by comparing at least a region of the image in the eye-gaze direction with the selected level of the hierarchical object recognition library 214.

At a block 408, the controller 220 controls the display device 205 to indicate a recognized object in the eye-gaze direction.

The method 400 will next be described with reference to FIG. 4 to FIG. 14. Indeed, attention is first directed to FIG. 5 which depicts a visual representation of an example embodiment of the hierarchical object recognition library 214, which stores object data and/or data representing and/or defining objects associated with vehicles, for example the vehicle 305. In particular, the example hierarchical object recognition library 214 comprises a plurality of levels 501-1, 501-2, 501-3 (alternatively referred to in FIG. 4, respectively, as Hierarchy 1, Hierarchy 2, and Hierarchy 3, the levels 501-1, 501-2, 501-3 further interchangeably referred to, collectively, as the levels 501 and, generically, as a level 501.

The plurality of levels 501 of the hierarchical object recognition library 214 may be organized according to object size. For example, each of the levels 501 include object data representing and/or defining objects of a given size, with the level 501-1 comprising data representing and/or defining an entire vehicle (and/or representing and/or defining high level components of objects). The level 501-2 comprises object data representing and/or defining components of the vehicle defined by the level 501-1 (and/or lower level components of the objects of the level 501-1), including, but not limited to, a front end, a front door including a respective window, a rear door including a respective window, and rear end, and the like. The level 501-3 comprises data representing and/or defining sub-components of the vehicle defined by the level 501-2 (and/or lowest level components and/or sub-components of the components of the level 501-2), including, but not limited to, wheels, lights, door handles, mirrors, windows, doors (without windows), and the like.

Indeed, put another way, the plurality of levels 501 of the example hierarchical object recognition library 214 are organized according to one or more of object components and object sub-components, with the object components of the level 501-2 being smaller than a size of the vehicle of the level 501-1, and the object sub-components of the level 501-3 being smaller than a size of the object components of the level 501-2.

Furthermore, as depicted, lines between the objects defined by each of the levels 501 indicate a relationship between objects of different levels 501. For example, a line 503-1 between a front end of the level 501-2 and the vehicle of the level 501-1 indicates the front end of the level 501-2 is a component of the vehicle of the level 501-1 (as well as a general position of the front end). Similarly, a line 503-2 between a light of the level 501-3 and the front end of the level 501-2 indicates the light of the level 501-3 is a sub-component of the front end of the level 501-2.

Furthermore, while objects in each of the levels 501 are visually represented, as are relationships therebetween using lines, it is understood that the objects represented and/or defined by each of the levels 501 comprise object data and/or data that represents and/or defines the objects including, but not limited to, models of the objects (including, but not limited to graphic models which define relationships between lines, curves, triangles, surfaces, points etc. of the objects), graphic representations and/or images of the objects, and the like.

In addition, it is assumed that the hierarchical object recognition library 214 may be provisioned at the memory 212 by an entity deploying the device 101, for example a first responder entity and the like. Furthermore, the hierarchical object recognition library 214 may be updated by receiving object data, and the like, for example, from the server 105.

In some implementations, the hierarchical object recognition library 214 is not stored at the device 101, but rather the hierarchical object recognition library 214 may be stored at a memory accessible to the controller 220, for example, at a memory of the server 105. In these implementations, when the method 400 is being implemented at the device 101, the block 406 includes transmitting the image acquired by the camera 203 to the server 105 and the server 105 may perform at least a portion of the block 406.

Figure 5:
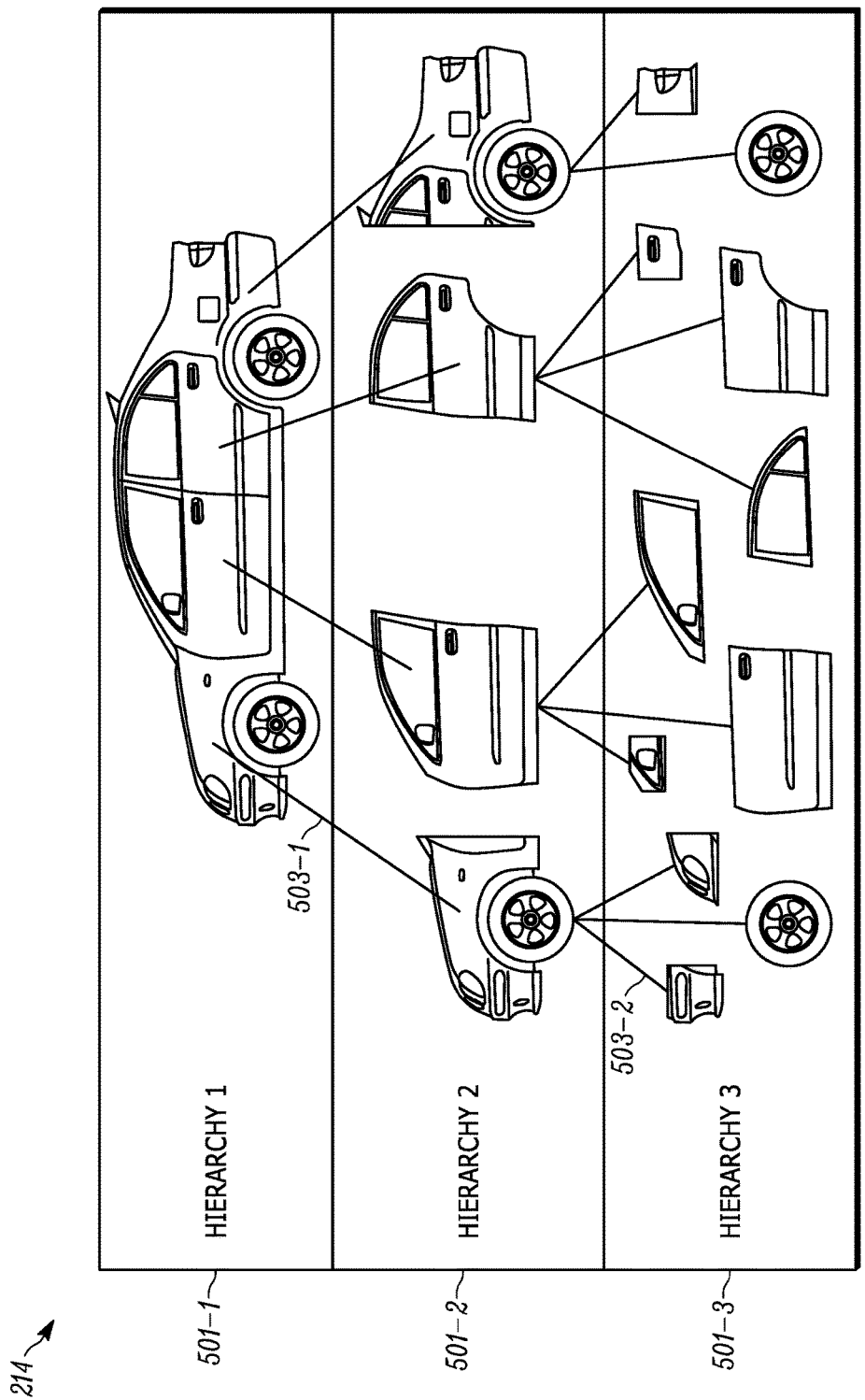
FIG. 5 depicts a visual representation of a hierarchical object recognition library in accordance with some embodiments.

Furthermore, while the hierarchical object recognition library 214 of FIG. 5 depicts objects and relationships of a generic vehicle, in other embodiments, objects and/or relationships of specific types of vehicles, including makes and/or models of specific types of vehicles may be provisioned at the hierarchical object recognition library 214. Indeed, other types of objects and/or relationships may be provisioned in the hierarchical object recognition library 214 including, but not limited to, houses, animals, and the like.

While the hierarchical object recognition library 214 depicts three levels 501, the hierarchical object recognition library 214 may comprise at least two levels 501 or more than three levels 501.

Figure 6:
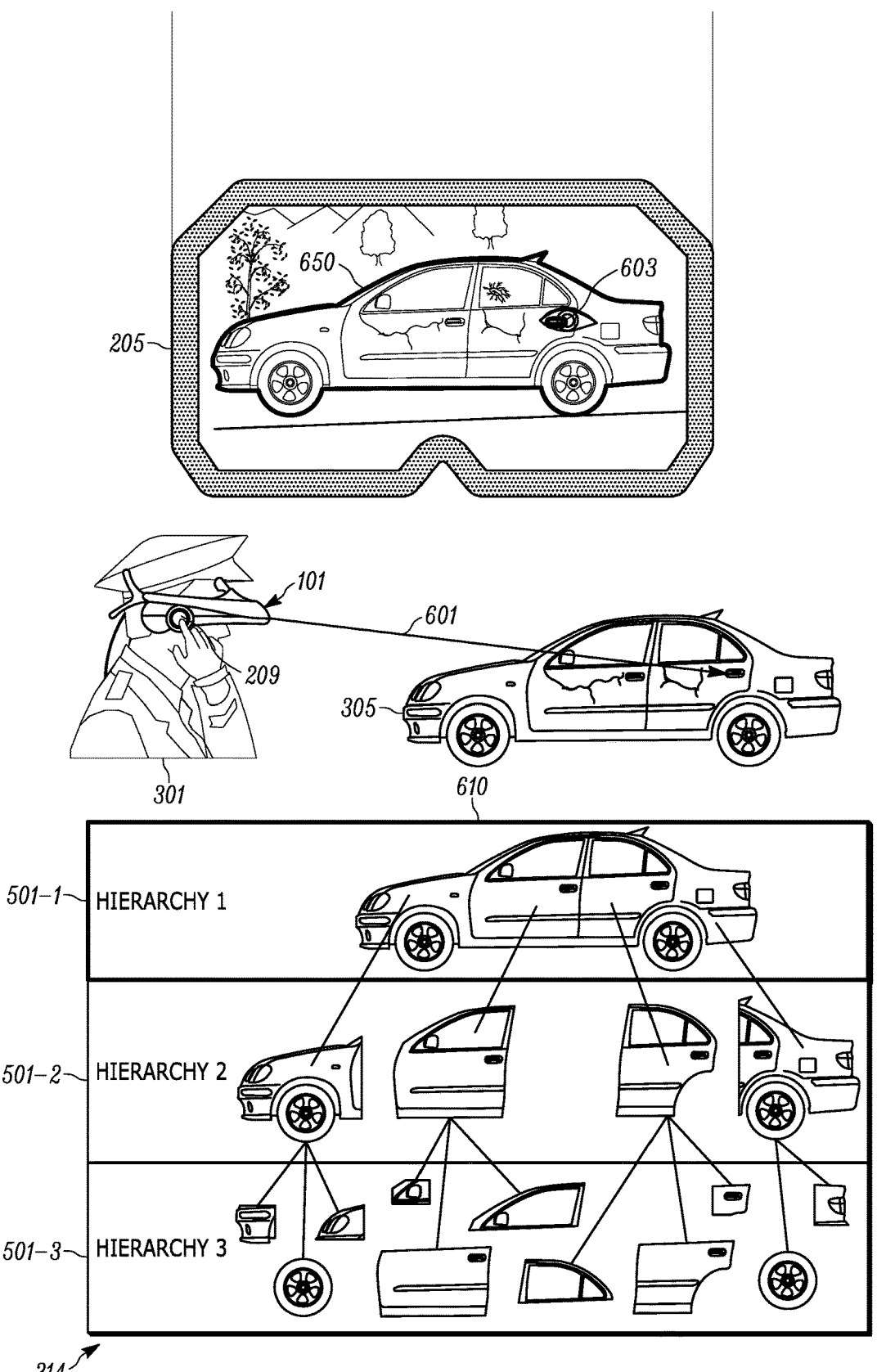
FIG. 6 depicts the device of FIG. 2 in use when a first level of a hierarchical object recognition library is selected in accordance with some embodiments.
Figure 7:
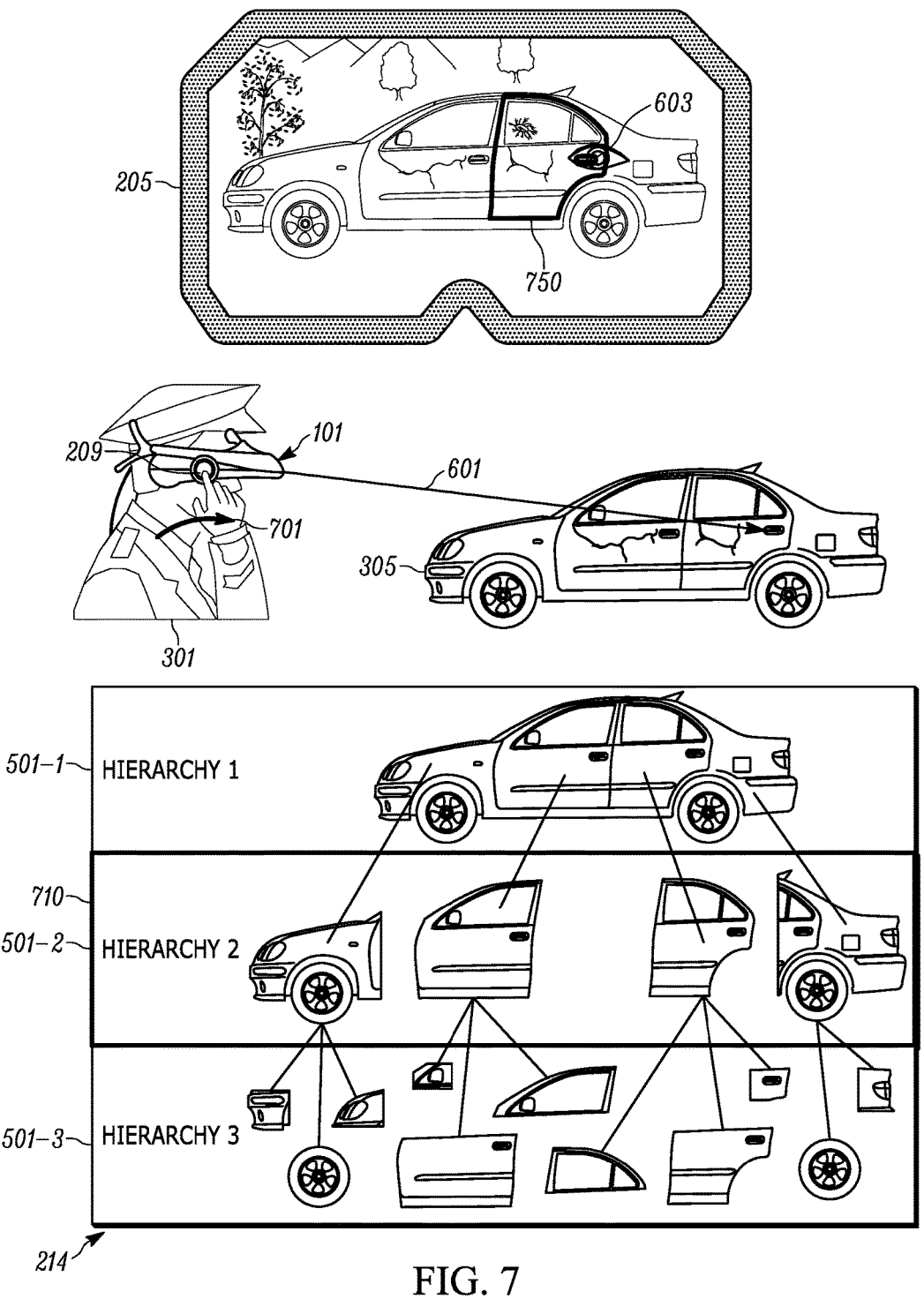
FIG. 7 depicts the device of FIG. 2 in use when a second level of a hierarchical object recognition library is selected in accordance with some embodiments.
Figure 8:
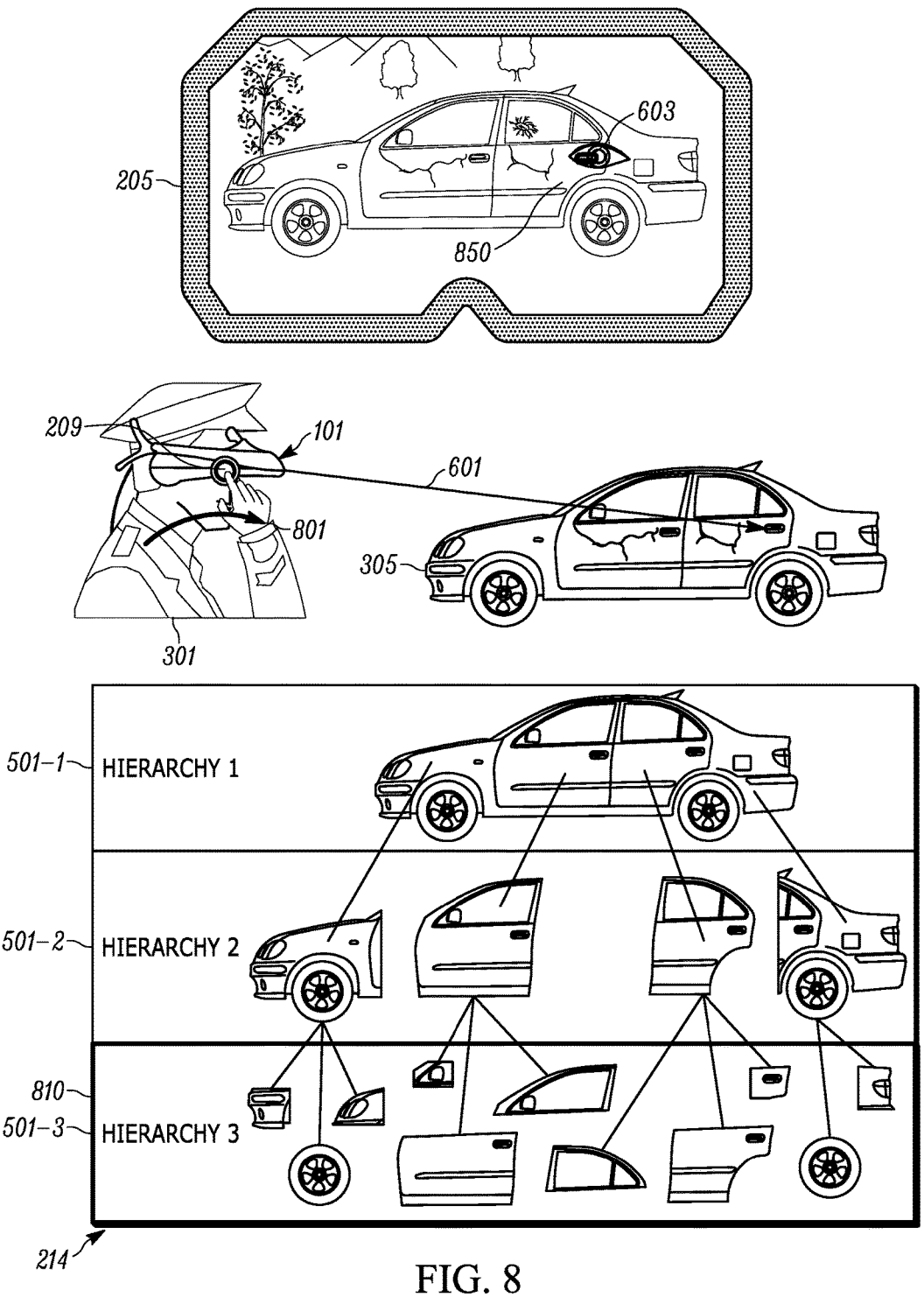
FIG. 8 depicts the device of FIG. 2 in use when a third level of a hierarchical object recognition library is selected in accordance with some embodiments.

Attention is next directed to FIG. 6, FIG. 7 and FIG. 8, which depict an example sequence in which the first responder 301 is wearing and interacting with the device 101, while gazing at a rear door handle of the vehicle 305. For the example sequence, it is assumed that the interaction depicted in FIG. 6 occurs first, the interaction depicted in FIG. 7 occurs after the interaction of FIG. 6, and the interaction depicted in FIG. 8 occurs after the interaction of FIG. 7.

Hence, it is assumed in each of FIG. 6, FIG. 7 and FIG. 8, that an eye-gaze direction 601 is in a direction of the rear door handle of the vehicle 305.

Each of FIG. 6, FIG. 7 and FIG. 8 further depict the display device 205, as well as images provided at the display device 205 (and/or a field-of-view visible through a transparent display device 205, with images corresponding to indicated objects provided at the transparent display device 205). Hence, each of FIG. 6, FIG. 7 and FIG. 8 further depict the vehicle 305, either in an image acquired by the camera 203, or in a field-of-view of display device 205.

Each of FIG. 6, FIG. 7 and FIG. 8 further depict an icon 603 at the display device 205 indicating a position of the vehicle 305 at which the first responder 301 is gazing, for example the rear door handle. Put another way, the icon 603 represents the eye-gaze direction 601 relative to the display device 205 and/or the vehicle 305. The icon 603 is, however, optional and is generally drawn in each of FIG. 6, FIG. 7 and FIG. 8 to show that the first responder 301 is gazing at the rear door handle in images provided at the display device 205 (and/or through the display device 205).

Each of FIG. 6, FIG. 7 and FIG. 8 further depict the example hierarchical object recognition library 214, as well as a selected level 501 of the example hierarchical object recognition library 214, as described in more detail below.

Each of FIG. 6, FIG. 7 and FIG. 8 further depict the first responder 301 interacting with the input device 209 of the device 101 to select a level 501 of the hierarchical object recognition library 214, for example by touching the touch panel with a finger, a touch at the touch panel represented in each of FIG. 6, FIG. 7 and FIG. 8 by a set of concentric circles drawn at a position where the touch panel is being touched. Put another way, each of the set of concentric circles in each of FIG. 6, FIG. 7 and FIG. 8 represent the block 402 of the method 400; in particular, as depicted, the controller 220 receives, using the input device 209, an indication of a selected level 501 of the hierarchical object recognition library 214 by detecting one or more of touch input and sliding touch input at the touch panel.

Attention is next directed to FIG. 6, which depicts the first responder 301 touching the input device 209 towards a rear of the device 101 to select a level 501 of the hierarchical object recognition library 214. As depicted, the selected level 501 comprises the level 501-1, as indicated by a box 610 around the level 501-1. Indeed, the selected level 501 of the hierarchical object recognition library 214 indicates a size of objects to be recognized in the eye-gaze direction 601; in other words, the input provided by the first responder 301 at the input device 209 indicates that, in the eye-gaze direction 601, objects in the level 501-1 are to be detected (and/or that largest objects of the hierarchical object recognition library 214 are to be detected).

Hence, it is further assumed that the controller 220 has implemented the block 404 of the method 400, either before, after, or in conjunction with the block 402, and that the controller 220 has hence determined the eye-gaze direction 601.

Hence, as the selected level 501 is the level 501-1, the controller 220, at the block 406, compares at least a region of an image (and/or images) from the camera 203 in the eye-gaze direction 601 with the level 501-1. As in this example the only object represented in the level 501-1 is the vehicle 305, the controller 220 recognizes the vehicle 305 in the images acquired by the camera 203 as a recognized object, for example by comparing at least a region of an image (and/or images) from the camera 203, and determining that there is a match between at least a portion of the image(s) and the object represented in the level 501-1. Furthermore, while in the depicted example, there is only one object represented in the level 501-1, in other implementations the level 501-1 includes representations and/or definitions of a plurality of object.

As a match was found, the controller 220, at the block 408, controls the display device 205 to indicate the vehicle 305, for example by providing an outline 650 around the vehicle 305 at the display device 205. Alternatively text, icons, and the like may be provided adjacent to and/or on the vehicle 305 at the display device 205.

However, with reference to FIG. 7, when the first responder 301 wishes to control the device 101 to recognize smaller objects, the first responder 301 interacts with the input device 209, for example by sliding the finger in a forward direction, as represented by the arrow 701. The controller 220 again implements the block 402, and determines that a selected level 501 is the level 501-2 the hierarchical object recognition library 214, as indicated by the box 710 drawn around the level 501-2. While the eye-gaze direction 601 has not changed, the block 404 may again be implemented to confirm such. Indeed, the block 404 may be repeated periodically independent of the remaining blocks of the method 400, such that the eye-gaze direction 601 is being periodically tracked by the controller 220.

As the selected level 501 in FIG. 7 is the level 501-2, the controller 220, at the block 406, compares at least a region of an image (and/or images) from the camera 203 in the eye-gaze direction 601 with the level 501-2 that is selected. Indeed, the region of images from the camera 203 that are compared with a selected level 501 may depend on a size of objects of the selected level 501. Hence, for example, when the level 501-1 is selected, the entirety of an image from the camera 203 is compared with the level 501-1; however, as the objects defined by the level 501-2 are smaller than those defined by the level 501-1, when the level 501-2 is selected, a portion of an image from the camera 203 may be compared with the level 501-2, for example around a diameter from a position represented by the icon 603, the diameter being determined, for example, from a largest object defined by the level 501-2.

Alternatively, when the entire image is compared with the level 501-2, and more than one object is recognized, only an object in the eye-gaze direction (e.g. as defined by the icon 603) is indicated at the block 408.

In the eye-gaze direction 601, as depicted, the controller 220 determines that a rear door of the vehicle 305 in the images acquired by the camera 203 as a recognized object, as the rear door of the vehicle 305 is represented by data in the level 501-2. Hence, the controller 220, at the block 408, controls the display device 205 to indicate the rear door of the vehicle 305, for example by providing an outline 750 around the rear door of the vehicle 305 at the display device 205.

With reference to FIG. 8, when the first responder 301 wishes to control the device 101 to recognize the smallest objects defined by the hierarchical object recognition library 214, the first responder 301 interacts with the input device 209, for example by continuing to slide the finger in a forward direction, as represented by the arrow 801. The controller 220 again implements the block 402, and determines that a selected level 501 is the level 501-3 the hierarchical object recognition library 214, as indicated by the box 810 drawn around the level 501-3. While the eye-gaze direction 601 has not changed, the block 404 may again be implemented to confirm such, as described above.

As the selected level 501 in FIG. 8 is the level 501-3, the controller 220, at the block 406, compares at least a region of an image (and/or images) from the camera 203 in the eye-gaze direction 601 with the level 501-3 that is selected using, for example a smaller region of images from the camera 203 used when selecting objects in either of the levels 501-1, 501-2.

In the eye-gaze direction 601, as depicted, the controller 220 determines that a handle of the rear door of the vehicle 305 in the images acquired by the camera 203 as a recognized object, as handle of the rear door of the vehicle 305 is represented by data in the level 501-3. Hence, the controller 220, at the block 408, controls the display device 205 to indicate the handle of the rear door of the vehicle 305, for example by providing an outline 850 around handle of the rear door of the vehicle 305 at the display device 205.

In this manner, the first responder 301 may control a size of an object being recognized using the device 101. Indeed, the first responder 301 may change the size of an object being recognized using the device 101 by sliding their finger forward (e.g. to decrease size) and backward (e.g. to increase size) along the touch panel and/or by touching regions of the touch panel depicted in each of FIG. 6, FIG. 7 and FIG. 8. Furthermore, directions associated with increasing or decreasing a size of objects to be recognized can be configurable and/or be different from those depicted.

Figure 9:
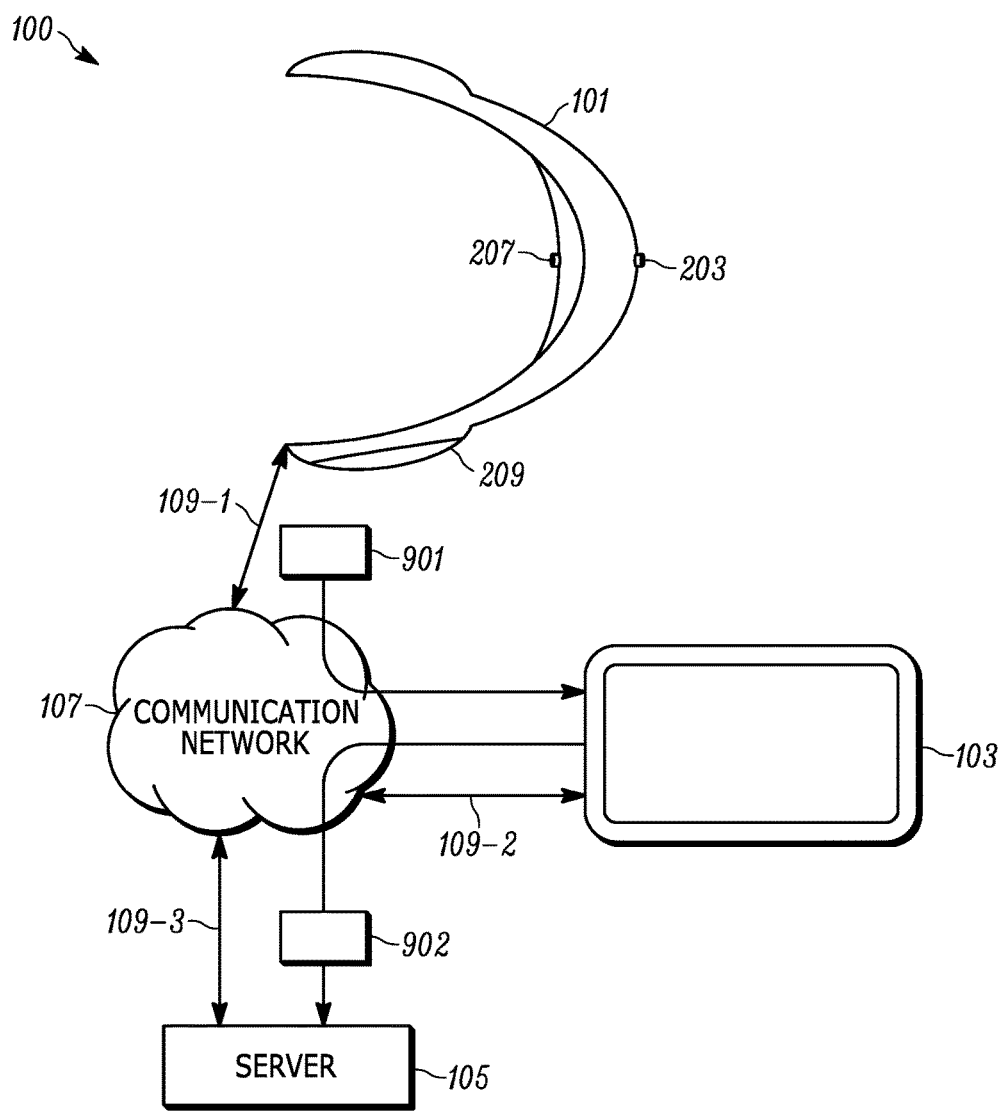
FIG. 9 depicts a report being generated in the system of FIG. 1 in accordance with some embodiments.

As depicted in FIG. 9, which is substantially similar to FIG. 1, with like elements having like numbers, once an object is recognized, and an indication thereof provided at the display device 205, the device 101 may transmit an image 901 that includes the indicated object (e.g. any of the images provided at the display device 205 as depicted in any of FIG. 6, FIG. 7 and FIG. 8) to the device 103 using the links 109-1, 109-2 and the network 107. The image 901 may be transmitted, for example, upon receipt of further input at the input device 209, for example, a given sequence of taps, and the like. The image 901 may be incorporated into a report 902, and the like, via, for example, the first responder 301 interacting with the device 103.

In each of FIG. 6, FIG. 7 and FIG. 8, it was assumed that the eye-gaze direction 601 did not change. However, as will next be explained with reference to FIG. 10, FIG. 11 and FIG. 12, the controller 220 may be further configured to, as the eye-gaze direction changes, recognize at least one object in image (e.g. from the camera 203) in a changed eye-gaze direction, and update the display device 205 to indicate a currently recognized object in the changed eye-gaze direction, rather than a previously recognized object in a previous eye-gaze direction.

Figure 10:
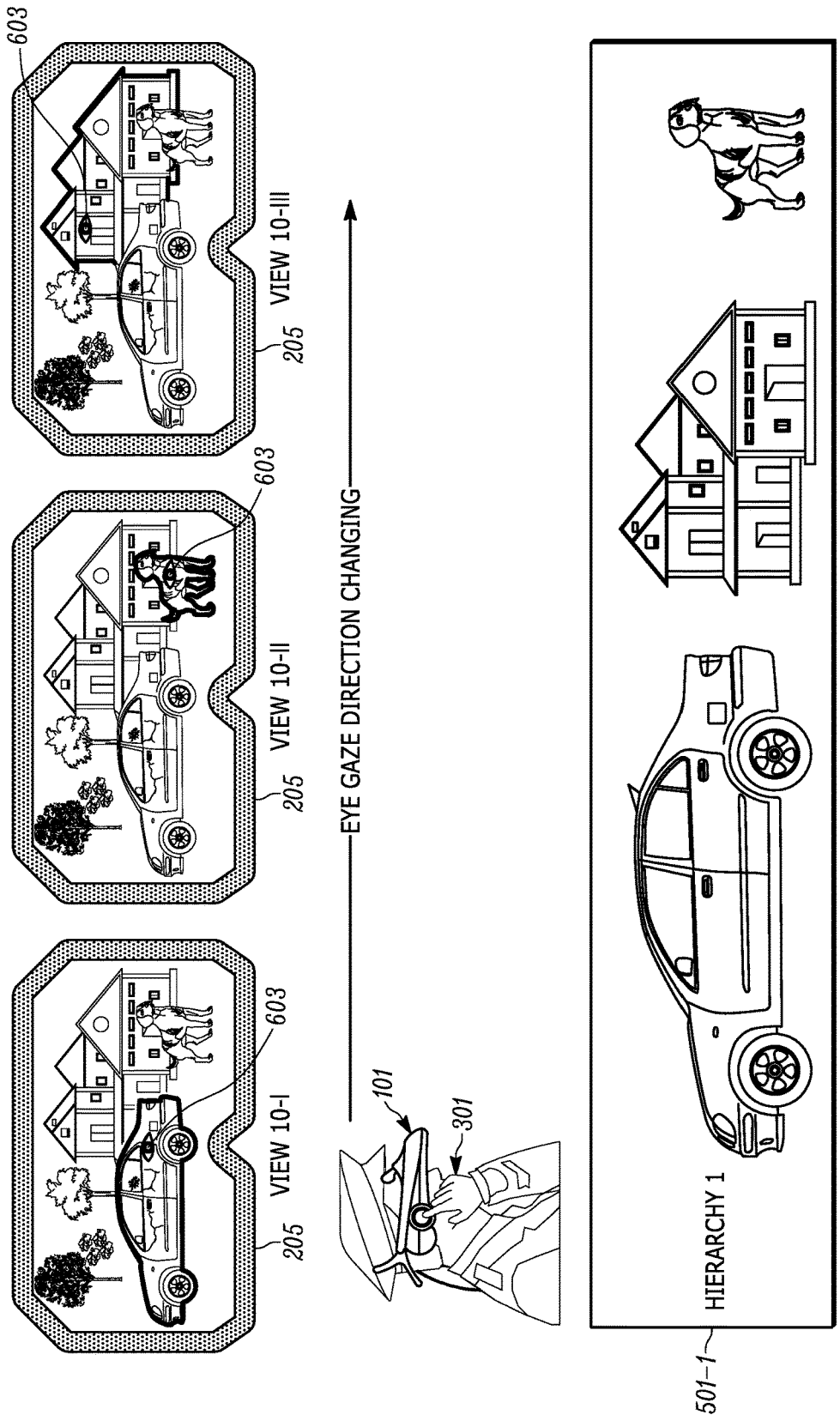
FIG. 10 depicts the device of FIG. 2 in use when a first level of a hierarchical object recognition library is selected and eye-gaze direction changes in accordance with some embodiments.

Attention is next directed to FIG. 10 which depicts the first responder 301 using and interacting with the device 101, as well as a sequence of views 10-I, 10-II, 10-III showing how images in the display device 205 are updated as an eye-gaze direction changes. For example, in each of the views 10-I, 10-II, 10-III, it is assumed that the eye-gaze direction of the first responder 301 changes to a position represented by the position of the icon 603. Hence, in view 10-1, the first responder 301 is gazing at a vehicle, in view 10-II, the first responder 301 is gazing at an animal (e.g. a cat), and, in view 10-III, the first responder 301 is gazing at a house, each of the vehicle, the animal, and the house being in a field-of-view of the camera 203 and/or of the first responder 301 through the display device 205 (e.g. when the display device 205 is transparent).

It is further assumed that the first responder 301 is selecting the first level 501-1 of the of the hierarchical object recognition library 214.

It is hence assumed in each of the views 10-I, 10-II 10-III of FIG. 10 that the controller 220 has implemented the blocks 402, 404 of the method 400.

Also depicted in FIG. 10 is another example embodiment of the first level 501-1 of the hierarchical object recognition library 214, updated to represent and/or define an animal and a house, in addition to a vehicle. As such, when the selected level 501 determined at the block 402 comprises the level 501-1 depicted in FIG. 10, at the block 406, the controller 220 may recognize the vehicle, the animal and/or the house, depending on the eye-gaze direction. The region of the image(s) acquired by the camera 203 that is compared with the level 501-1 may be defined by a diameter around the position where the icon 603 is located. Alternatively, when the entire image is compared with the level 501-1, and more than one object is recognized, only an object in the eye-gaze direction (e.g. as defined by the icon 603) is indicated at the block 408.

As an eye-gaze of the first responder 301 moves from the vehicle to the animal to the house, each of the vehicle to the animal to the house are outlined at the display device 205. In other words, the display device 205 is updated to indicate a currently recognized object in a changed eye-gaze direction (e.g. in the views 10-II, 10-III), rather than a previously recognized object in a previous eye-gaze direction (e.g. in the views 10-I).

Figure 11:
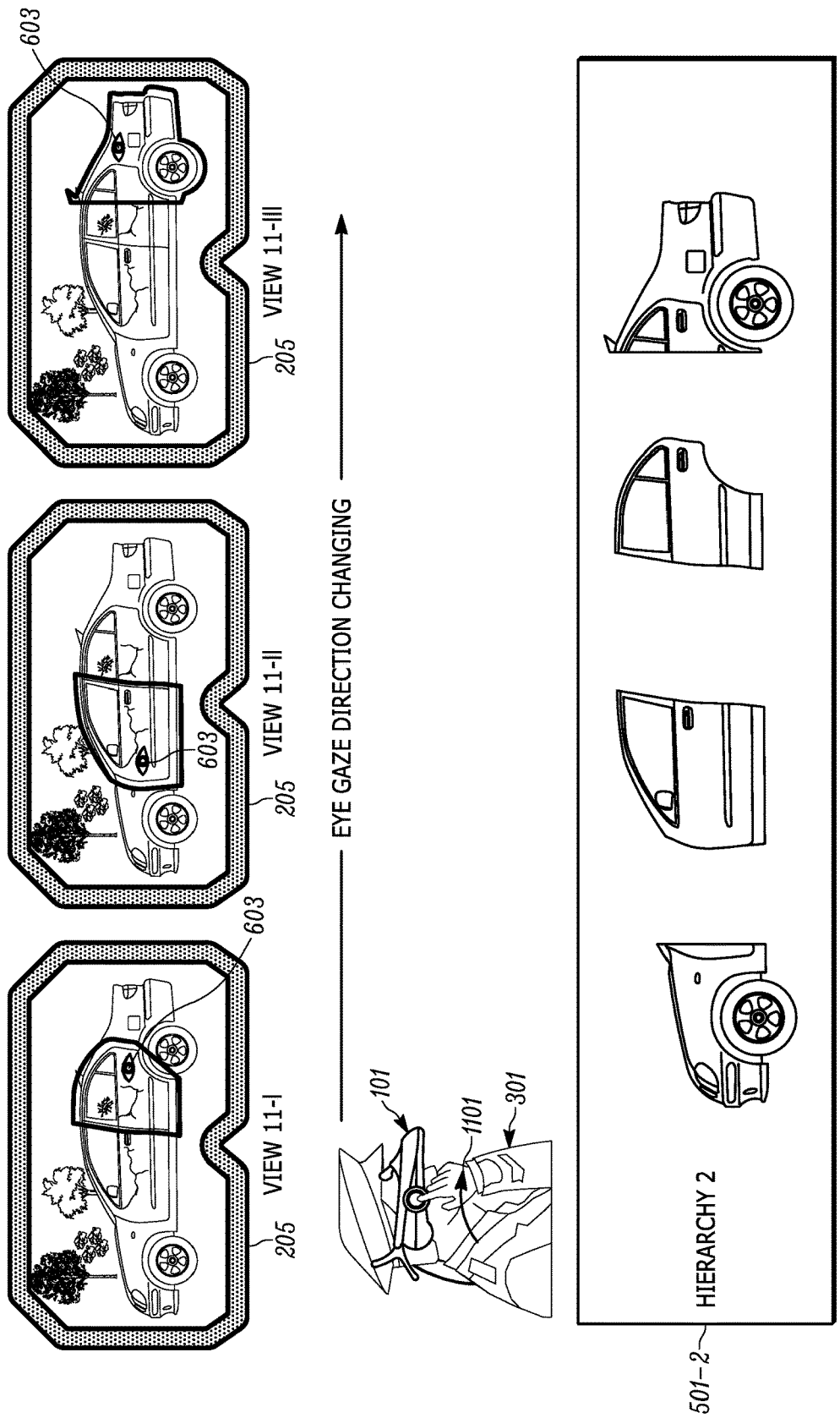
FIG. 11 depicts the device of FIG. 2 in use when a second level of a hierarchical object recognition library is selected and eye-gaze direction changes in accordance with some embodiments.

Attention is next directed to FIG. 11 which depicts the first responder 301 sliding their finger forward at the input device 209, represented by the arrow 1101, similar to FIG. 7, to select the second level 501-2. It is further assumed in FIG. 11 that the first responder 301 has moved, and/or adjusted the camera 203, such that the house and the animal of FIG. 10 are out of the field-of-view of the camera 203 and hence the first responder 301 is viewing the vehicle and not the animal and the house.

FIG. 11 further depicts, a sequence of views 11-I, 11-II, 11-III showing how images in the display device 205 are updated as an eye-gaze direction changes. For example, as in FIG. 10, in each of the views 11-I, 11-II, 11-III, it is assumed that the eye-gaze direction of the first responder 301 changes to a position represented by the position of the icon 603. Hence, in view 11-1, the first responder 301 is gazing at a rear door of the vehicle, in view 11-II, the first responder 301 is gazing at a front door of the vehicle, and, in view 11-III, the first responder 301 is gazing at a rear end of the vehicle.

It is hence assumed in each of the views 11-I, 11-II 11-III of FIG. 11 that the controller 220 has implemented the blocks 402, 404 of the method 400.

Also depicted in FIG. 11 is the second level 501-2 of the hierarchical object recognition library 214 which defines and/or represent components of the vehicle. As such, when the selected level 501 determined at the block 402 comprises the level 501-2 depicted in FIG. 11, at the block 406, the controller 220 may recognize the front end, the rear end, the front door (with a window) and the rear door (with a window), depending on the eye-gaze direction. The region of the image(s) acquired by the camera 203 that is compared with the level 501-2 may be defined by a diameter around the position where the icon 603 is located. Alternatively, when the entire image is compared with the level 501-2, and more than one object is recognized, only an object in the eye-gaze direction (e.g. as defined by the icon 603) is indicated at the block 408.

As an eye-gaze of the first responder 301 moves from the rear door to the front door to the rear end of the vehicle, each of the rear door to the front door to the rear end of the vehicle are outlined at the display device 205.

Figure 12:
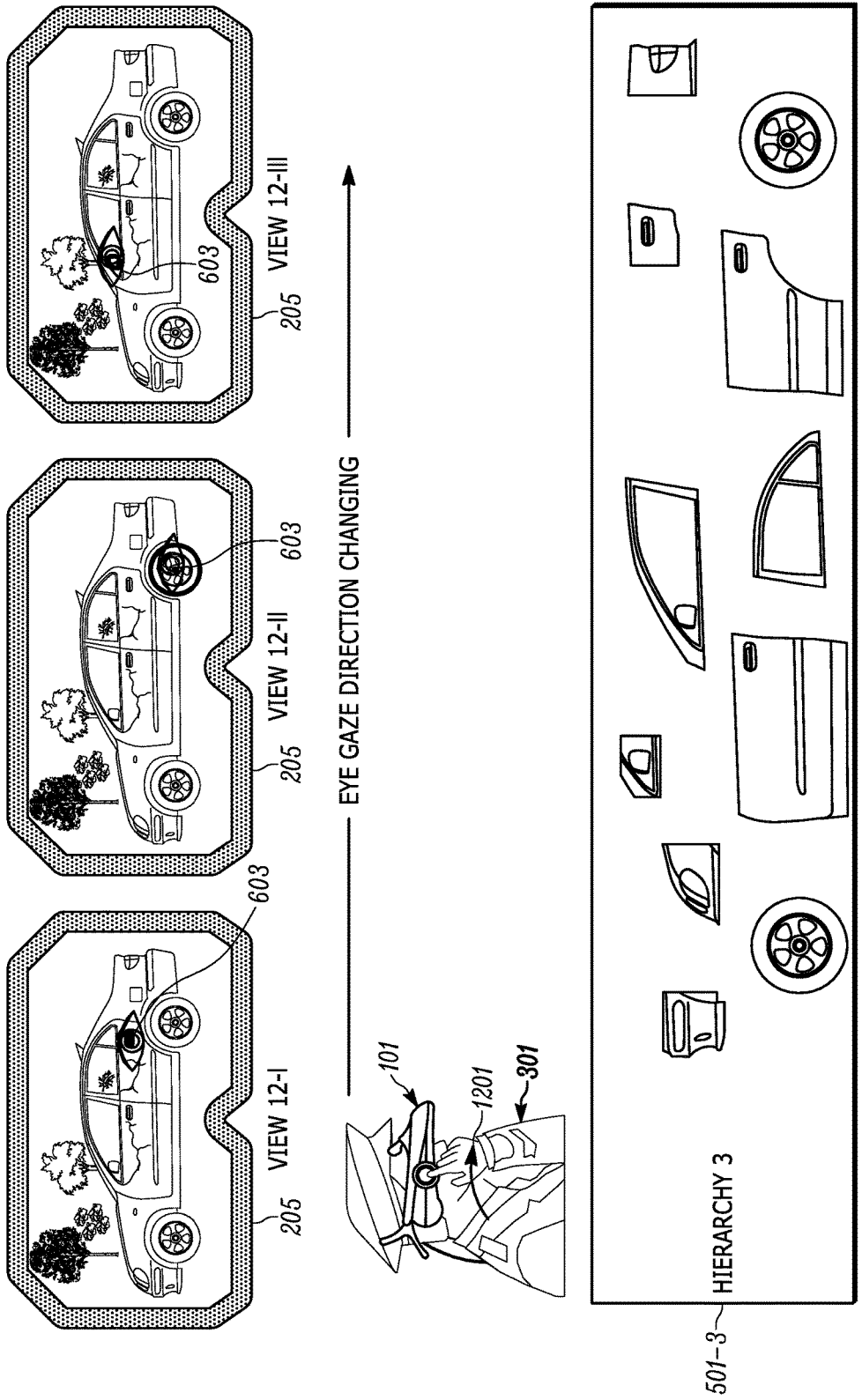
FIG. 12 depicts the device of FIG. 2 in use when a third level of a hierarchical object recognition library is selected and eye-gaze direction changes in accordance with some embodiments.

As in FIG. 8, however, when the first responder 301 wishes to recognize the smallest object defined by the hierarchical object recognition library 214, the first responder 301 may select the third level 501-3. Indeed, attention is next directed to FIG. 12 which depicts the first responder 301 sliding their finger forward at the input device 209, represented by the arrow 1201, similar to FIG. 8, to select the third level 501-3. FIG. 12 further depicts, a sequence of views 12-I, 12-II, 12-III showing how images in the display device 205 are updated as an eye-gaze direction changes. For example, as in FIG. 10 and FIG. 11, in each of the views 12-I, 12-II, 12-III, it is assumed that the eye-gaze direction of the first responder 301 changes to a position represented by the position of the icon 603. Hence, in view 12-I, the first responder 301 is gazing at a rear door handle of the vehicle, in view 12-II, the first responder 301 is gazing at a rear wheel of the vehicle, and, in view 12-III, the first responder 301 is gazing at a front side mirror (e.g. a side rear-view mirror) of the vehicle.

It is hence assumed in each of the views 12-I, 12-II 12-III of FIG. 12 that the controller 220 has implemented the blocks 402, 404 of the method 400.

Also depicted in FIG. 12 is the third level 501-3 of the hierarchical object recognition library 214 which defines and/or represent sub-components of the vehicle. As such, when the selected level 501 determined at the block 402 comprises the level 501-3 depicted in FIG. 12, at the block 406, the controller 220 may recognize the sub-components defined by the third level 501-3, depending on the eye-gaze direction. The region of the image(s) acquired by the camera 203 that is compared with the level 501-3 may be defined by a diameter around the position where the icon 603 is located. Alternatively, when the entire image is compared with the level 501-3, and more than one object is recognized, only an object in the eye-gaze direction (e.g. as defined by the icon 603) is indicated at the block 408.

As an eye-gaze of the first responder 301 moves from the rear door handle to the rear wheel to the front side mirror of the vehicle, each of the rear door handle to the rear wheel to the front side mirror of the vehicle are outlined at the display device 205.

Hence, put another way, each FIG. 10, FIG. 11, and FIG. 12 depict the device 101 "snapping" to different objects provided at the display device 205, depending on a selected level 501 as the eye gaze direction changes. Indeed, the selected level 501 indicates one or more of a size of an object to be searched in the hierarchical object recognition library 214 and/or indicated at the display device 205. Hence, by changing the selected level 501 of the hierarchical object recognition library 214, and thus the size of an object to be searched, a resolution of an eye gaze selection of objects within the field-of-view of the camera 203 and/or the first responder 301 (or any other viewer) also changes. For example, when the size of the object to be searched is "big", for example way of selecting the level 501-1, (e.g. eye gaze selection is to be snapped to bigger objects when the first responder 301 selects a level corresponding to "high level" components), the resolution of the eye gaze selection of the objects within the field-of-view is low (e.g. larger objects are selected); similarly, when the size for the object to be searched is reduced, for example way of selecting one of the levels 501-2, 501-3 (e.g. eye gaze selection is to be snapped to smaller objects when the first responder 301 selects a level corresponding to components or sub-components of components), the resolution of the eye gaze selection on the objects within the field-of-view is increased (e.g. smaller and/or finer component are selected).

In each of embodiments described heretofore, the controller 220 may not recognize any objects using the selected level 501 of the hierarchical object recognition library 214, for example, as the hierarchical object recognition library 214 may not be provisioned with data representing any of the objects in the field-of-view of the camera 203. In these embodiments, however, the controller may be further configured to, when no objects are recognized using the selected level 501 of the hierarchical object recognition library 214, control the display device 205 to indicate an object (e.g. an object-of-interest) in the eye-gaze direction based on an object size corresponding to the selected level 501. For example, an object size may be associated with each of the levels 501 of the hierarchical object recognition library 214, and when no object is recognized using the selected level 501, the associated object size is used to recognize and/or indicate and/or outline objects as described above. For example, the object size may be defined by a diameter, and the like, from an eye-gaze position, associated with each of the levels 501. When objects in images from the camera 203 are within the associated diameter, the objects may be recognized and/or indicated and/or outlined using edge detection techniques.

In some embodiments, objects may be at least partially out of a field-of-view of the camera 203. In these embodiments, other cameras may be used to acquire images of the object to assist in recognizing the object.

Figure 13:
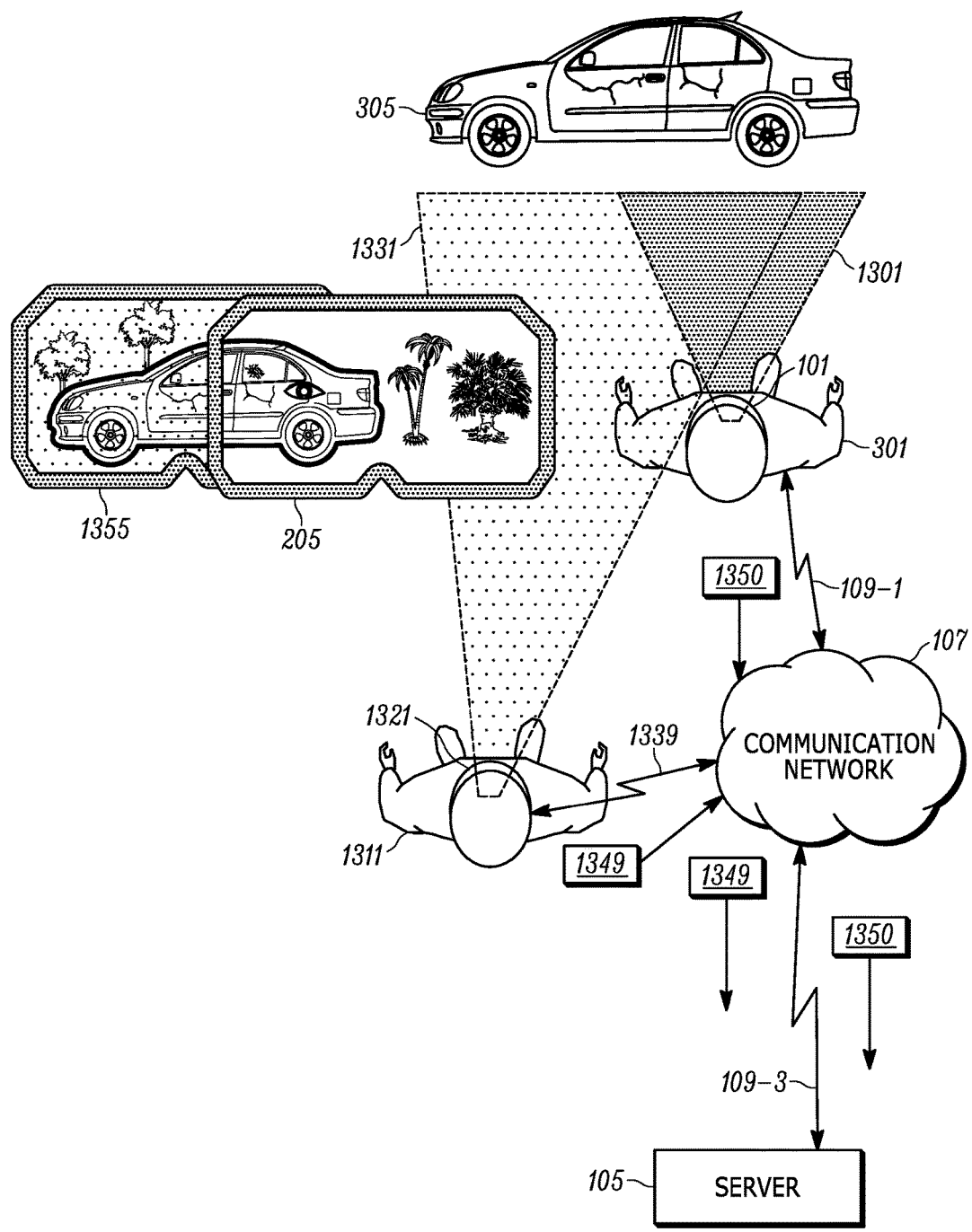
FIG. 13 depicts the device of FIG. 2 transmitting a request to a server to acquire a respective image of an object that is partially in a field-of-view of a camera in accordance with some embodiments.

For example, attention is next directed to FIG. 13 which depicts the first responder 301 wearing the device 101, and gazing at the vehicle 305, the device 101 in communication with the server 105 via the links 109-1, 109-3, and the network 107. However, as depicted the vehicle 305 is only partially in a field-of-view 1301 of the camera 203 of the device 101. Hence, when the selected level 501 of the hierarchical object recognition library 214 is, for example, the first level 501-1, the vehicle 305 may not be recognized using the method 400.

However, also depicted in FIG. 13 is another first responder 1311 (e.g. another police officer and the like) using a device 1321 that is similar to the device 101. However, as the first responder 1311 is standing further away from the vehicle 305, the vehicle 305 is either in a field-of-view 1331 of a camera (not depicted) of the device 1321, or portion of the vehicle 305 is within the field-of-view 1331 such that an image of the portion of the vehicle 305 within the field-of-view 1331 complements an image of a respective portion of the vehicle 305 within the field-of-view 1301, as acquired by the camera 203, as described hereafter.

It is furthermore assumed that the device 1321 is in communication with the server 105 via a respective communication link 1339 (similar to the link 109-1), the link 109-3 and the network 107. Hence, the device 1321 may transmit images 1349 acquired by the camera of the device 1321 to the server 105 periodically and/or upon request.

In any event, also depicted in FIG. 13 is the display device 205 of the device 101 where it is apparent that the vehicle 305 is not fully viewable. Furthermore, as it is assumed that the level 501-1 is selected, the controller 220 may fail to recognize an object in images from the camera 203. In these instance the controller 220 may be further configured to: when an object to be recognized is partially out of the field-of-view 1301 of the camera 203, transmit a request 1350 to the server 105 to acquire a respective image of the object to be recognized using one or more other cameras, for example images from the camera of the device 1321. In some embodiments, the request 1350 includes images acquired by the device 101 that include a partial view of the vehicle 305.

Furthermore, the controller 220 may be configured to determine that an object to be recognized is partially out of the field-of-view 1301 of the camera 203 by using edge detection to determine that an object-of-interest stops at an edge of the images acquired by the camera 203, and/or that an edge of an object-of-interest is the same as an edge of the images acquired by the camera 203, and the like.

Indeed, also depicted in FIG. 13 is a display device 1355 of the device 1321, depicted overlapping with the display device 205. As is apparent, the vehicle 305 is viewable by the device 1321. The server 105 receives images 1349 from the device 1321 and one or more of: transmit the images 1349 to the device 101, for example in response to the request 1350, such that the device 101 may combined the images 1349 with images acquired by the camera 203; and combines the images 1349 with any images received in the request 1350 and transmits the combined images to the device 101. Either way, the images 1349 received from the device 1321 are used to construct an entire image of the vehicle 305, which is then compared to the level 501-1 to recognize objects, according to the method 400. For example, as depicted, the portion of the vehicle 305 in an image 1349 at the display device 1355 is at least complementary to the respective portion of the vehicle 305 in the image at the display device 205, such that an image of the entirety of the vehicle 305 in the combined fields-of-view 1301, 1331 may be generated.

Furthermore, while FIG. 13 is described with reference to a second camera being at the device 1321, in other implementations images from other types of cameras can be used to construct an entire image of the vehicle 305 including, but not limited to, closed circuit television cameras, vehicle cameras, and the like in communication with the server 105. Indeed, the server 105 may be configured to select a most suitable camera from which to acquire images to assist with the request 1350 based on one or more of locations of the cameras, a location of the device 101, inertia sensors and the other cameras, and the like.

While example embodiments described heretofore have been described with respect to devices that are wearable, the method 400 may be implemented in other types of devices including, but not limited to portable devices and/or mobile devices such as tablets, laptops, cell phones, cameras, and the like, that have a structure similar to that depicted in FIG. 2, though a respective camera, eye-tracking device and display device may not be specifically configured as an augmented reality device. For example, a forward-facing camera may be used to acquire images similar to the camera 203, and a rear-facing and/or user facing camera may be used for eye tracking. For example, attention is next directed to FIG. 14 and FIG. 15 which depicts respectively depict rear and front view of a device 1401 being used by a user 1402 to acquire images of the vehicle 305. As depicted, the device 1401 comprises a tablet device, implementing the method 400, for example, at a respective controller, and it is further that the device 1401 has access to a hierarchical object recognition library similar to the hierarchical object recognition library 214 stored at a memory of the device 1401 and/or accessible to the device 1401 using, for example a communications network.

Figure 14:
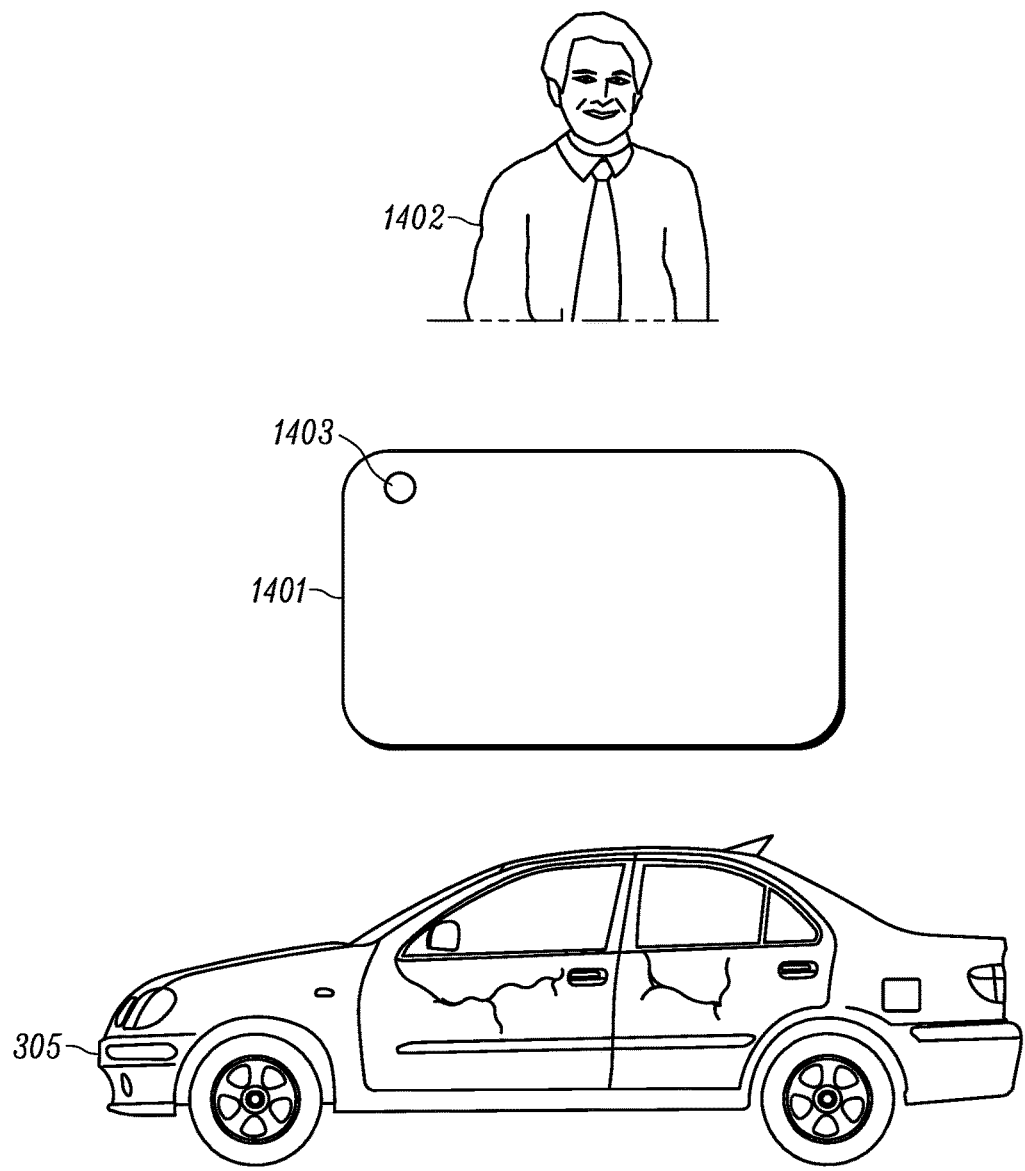
FIG. 14 depicts a rear view of a device for hierarchical object recognition in use to detect objects associated with a vehicle in accordance with some embodiments.
Figure 15:
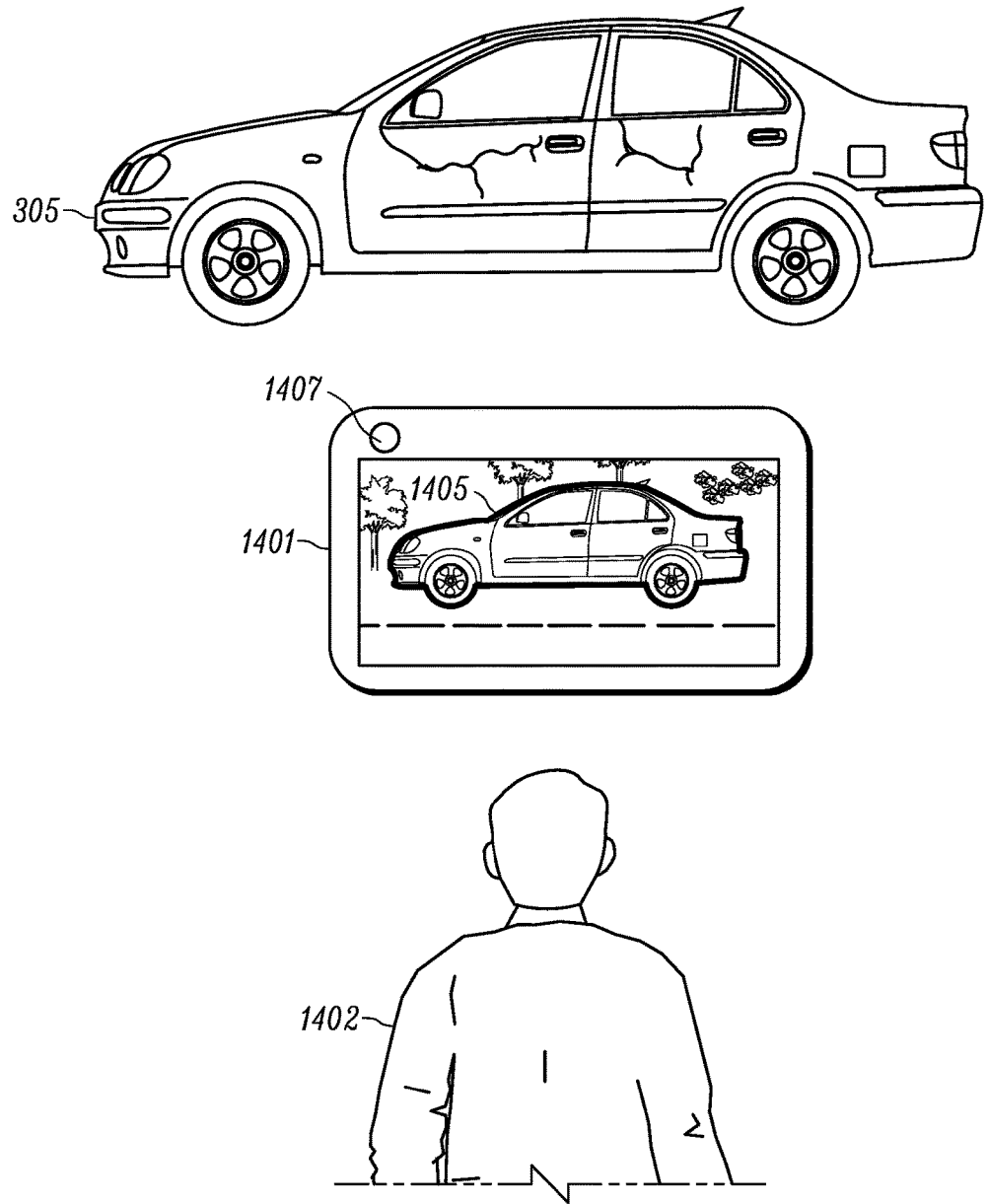
FIG. 15 depicts a front view of the device of FIG. 14 in accordance with some embodiments.

In any event, in FIG. 14, a camera 1403 (e.g. a forward-facing camera) of the device 1401 is depicted facing the vehicle 305, while in FIG. 15 a display device 1405 and a rear-facing camera 1407 facing the user 1402. It is further assumed that the device 1401 includes an input device, including, but not limited to, a touch screen device integrated with the display device 1405 used to implement the block 402 of the method 400. The rear-facing camera 1407 may be used to track the eyes of the user 1402 at the block 404. The controller of the device 1401 may implement the block 406 to recognize objects in images from the camera 1403. And the controller of the device 1401 may implement the block 408, as depicted in FIG. 15, to control the display device 1405 to indicate a recognized object in an eye-gaze direction, for example, as depicted, the vehicle 305.

Figure 16:
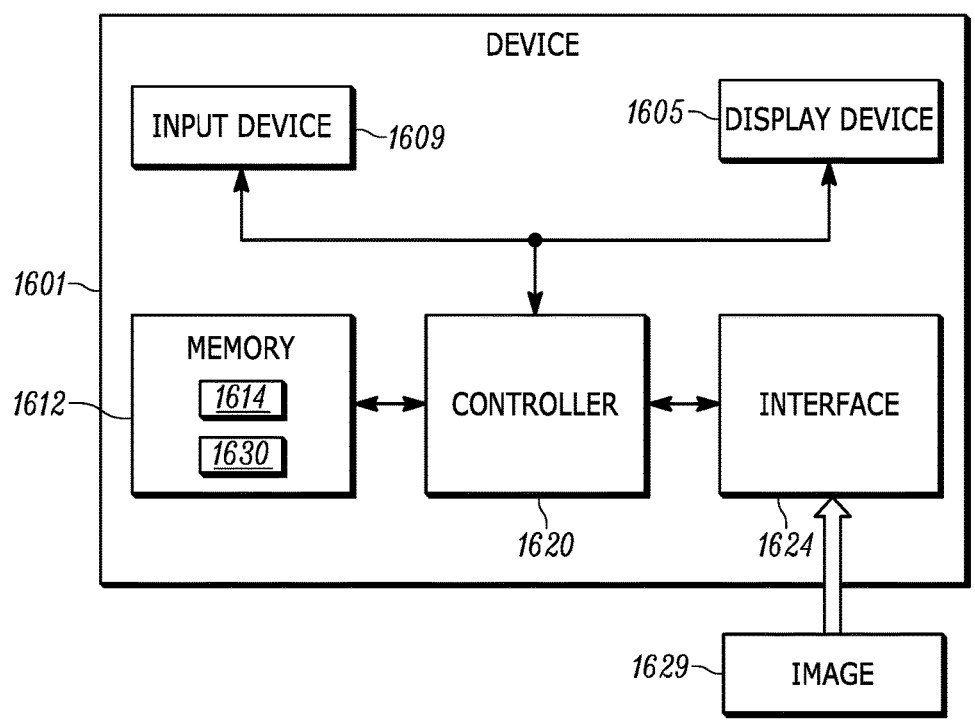
FIG. 16 is a block diagram of a device for hierarchical object recognition in accordance with some embodiments.

Attention is next directed to FIG. 16 which depicts a block diagram of a device 1601 configured for hierarchical object recognition. The device 1601 is similar to the device 101 and/or the device 1401 and comprises: a display device 1605; an input device 1609; a memory 1612 storing a hierarchical object recognition library 1614 arranged in a plurality of levels similar to the hierarchical object recognition library 214; a controller 1620, and an optional a communication interface 1624, the controller 1620 communicatively coupled to the display device 1605, the input device 1609, the memory 1612 and, when present, the interface 1624. In contrast to the device 101, however, the device 1601 does not necessarily comprise an augmented display device and/or cameras and/or an eye-tracking device, nor is device 1601 wearable. Rather, the device 1601 can comprise one or more of a tablet, a cell phone, a personal computer, a laptop, and the like. The device 1601 may receive images 1629 using the interface 1624 (as depicted), and/or the input device and/or using a removeable memory and the like.

The memory 1612 further stores an application 1630 which, when implemented by the controller 1620 enables the controller 1620 to: receive an image 1629 including a plurality of objects; receive, using the input device 1609, an indication of a selected level of the hierarchical object recognition library 1614; determine an eye-gaze direction; recognize at least one of the objects in the image 1629 by comparing at least a region of the image 1629 in the eye-gaze direction with the selected level of the hierarchical object recognition library 1614; and control the display device 1605 to indicate a recognized object in the eye-gaze direction. The eye-gaze direction may be determined from data received with the image 1629 and/or by receiving an eye-gaze direction from an external sensor in communication with the device 1601.

Figure 17:
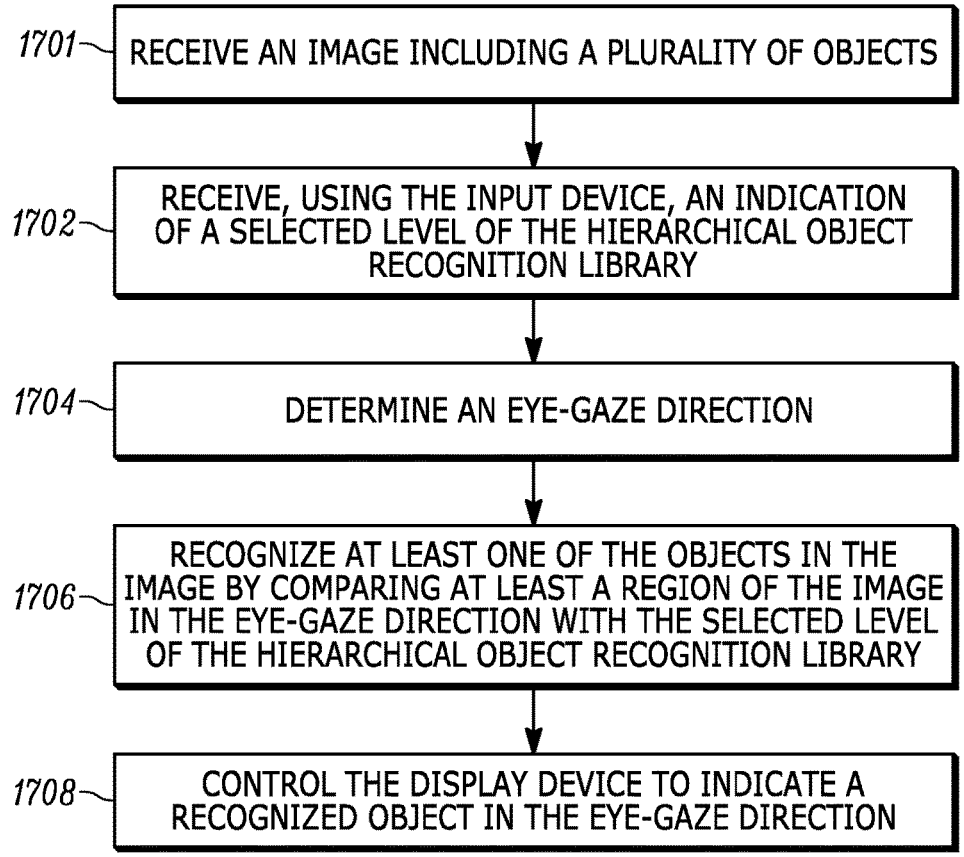
FIG. 17 is a flowchart of a method of hierarchical object recognition in accordance with some embodiments, in accordance with some embodiments.

Attention is now directed to FIG. 17 which depicts a flowchart representative of a method 1700 for implementing a hierarchical object recognition. In some embodiments, the operations of the method 1700 of FIG. 17 correspond to machine readable instructions that are executed by, for example, the device 1601, and specifically by the controller 1620 of the device 1601. In the illustrated example, the instructions represented by the blocks of FIG. 17 are stored at the memory 1612, for example, as the application 1630. The method 1700 of FIG. 17 is one way in which the device 1601 and/or the controller 1620 is configured. Furthermore, the following discussion of the method 1700 of FIG. 17 will lead to a further understanding of the device 1601, and its various components.

However, it is to be understood that the device 1601 and/or the controller 1620 and/or the method 1700 may be varied, and need not work exactly as discussed herein in conjunction with each other, and that such variations are within the scope of present embodiments.

Furthermore, the method 1700 of FIG. 17 need not be performed in the exact sequence as shown and likewise various blocks may be performed in parallel rather than in sequence. Accordingly, the elements of method 1700 are referred to herein as "blocks" rather than "steps".

At the block 1701, the controller 1620 receives the image 1629 including a plurality of objects.

At the block 1702, the controller 1620 receives, using the input device 1609, an indication of a selected level of the hierarchical object recognition library 1614. Block 1702 is hence similar to the block 402 of the method 400.

At the block 1704, the controller 1620 determine an eye-gaze direction. Block 1704 is hence similar to the block 404 of the method 400.

At the block 1706, the controller 1620 recognizes at least one of the objects in the image 1629 by comparing at least a region of the image in the eye-gaze direction with the selected level of the hierarchical object recognition library 1614. Block 1706 is hence similar to the block 406 of the method 400.

At the block 1708, the controller 1620 controls the display device 1605 to indicate a recognized object in the eye-gaze direction. Block 1708 is hence similar to the block 408 of the method 400.

Disclosed herein are devices for hierarchical object recognition in images, using a combination of a hierarchical object recognition library and an eye-gaze direction detected, for example, using an eye-tracking device, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device comprising:
   an augmented reality display device including a camera, a display device, and an eye-tracking device;
   an input device;
   a memory storing a hierarchical object recognition library arranged in a plurality of levels;
   a communication interface; and
   a controller configured to:
   receive, using the input device, an indication of a selected level of the hierarchical object recognition library;
   determine, using the eye-tracking device, an eye-gaze direction;
   recognize at least one object in an image from the camera in the eye-gaze direction by comparing at least a region of the image in the eye-gaze direction with the selected level of the hierarchical object recognition library;
   control the display device to indicate a recognized object in the eye-gaze direction; and
   when an object to be recognized is partially out of a field-of-view of the camera, transmit, using the communication interface, a request to a server to acquire a respective image of the object to be recognized using one or more other cameras.

2. The device of claim 1, wherein the controller is further configured to control the display device to indicate the recognized object in the eye-gaze direction by providing an outline around the recognized object.

3. The device of claim 1, wherein the selected level of the hierarchical object recognition library indicates a size of objects to be recognized in the eye-gaze direction.

4. The device of claim 1, wherein the plurality of levels of the hierarchical object recognition library are organized according to object size.

5. The device of claim 1, wherein the plurality of levels of the hierarchical object recognition library are organized according to one or more of object components and object sub-components.

6. The device of claim 1, wherein the controller is further configured to, as the eye-gaze direction changes, recognize the at least one object in the image in a changed eye-gaze direction, and update the display device to indicate a currently recognized object in the changed eye-gaze direction, rather than a previously recognized object in a previous eye-gaze direction.

7. The device of claim 1, wherein the controller is further configured to recognize the at least one object in the image from the camera in the eye-gaze direction using edge detection.

8. The device of claim 1, wherein the controller is further configured to, when no objects are recognized using the selected level of the hierarchical object recognition library, control the display device to indicate an object in the eye-gaze direction based on an object size corresponding to the selected level.

9. The device of claim 1, wherein the input device comprises a touch panel, and the controller is further configured to receive the indication of the selected level of the hierarchical object recognition library by detecting one or more of touch input and sliding touch input at the touch panel.

10. A method comprising:
at a device comprising: an augmented reality display device including a camera, a display device, and an eye-tracking device; an input device; a memory storing a hierarchical object recognition library arranged in a plurality of levels; and a controller, receiving, using the input device, an indication of a selected level of the hierarchical object recognition library;
determining, using the eye-tracking device, an eye-gaze direction;
recognizing, using the controller, at least one object in an image from the camera in the eye-gaze direction by comparing at least a region of the image in the eye-gaze direction with the selected level of the hierarchical object recognition library;
controlling, using the controller, the display device to indicate a recognized object in the eye-gaze direction; and
when an object to be recognized is partially out of a field-of-view of the camera, transmitting, using a communication interface of the device, a request to a server to acquire a respective image of the object to be recognized using one or more other cameras.

11. The method of claim 10, further comprising controlling, using the controller, the display device to indicate the recognized object in the eye-gaze direction by providing an outline around the recognized object.

12. The method of claim 10, wherein the selected level of the hierarchical object recognition library indicates a size of objects to be recognized in the eye-gaze direction.

13. The method of claim 10, wherein the plurality of levels of the hierarchical object recognition library are organized according to object size.

14. The method of claim 10, wherein the plurality of levels of the hierarchical object recognition library are organized according to one or more of object components and object sub-components.

15. The method of claim 10, further comprising, as the eye-gaze direction changes, recognizing, using the controller, the at least one object in the image in a changed eye-gaze direction, and update the display device to indicate a currently recognized object in the changed eye-gaze direction, rather than a previously recognized object in a previous eye-gaze direction.

16. The method of claim 10, further comprising recognizing, using the controller, the at least one object in the image from the camera in the eye-gaze direction using edge detection.

17. The method of claim 10, further comprising, when no objects are recognized using the selected level of the hierarchical object recognition library, controlling, using the controller, the display device to indicate an object in the eye-gaze direction based on an object size corresponding to the selected level.

18. A device comprising:
a display device;
an input device;
a memory storing a hierarchical object recognition library arranged in a plurality of levels; and
a controller communicatively coupled to the display device, the input device, and the memory, the controller configured to:
receive an image including a plurality of objects;
receive, using the input device, an indication of a selected level of the hierarchical object recognition library;
determine an eye-gaze direction;
recognize at least one of the objects in the image by comparing at least a region of the image in the eye-gaze direction with the selected level of the hierarchical object recognition library;
control the display device to indicate a recognized object in the eye-gaze direction; and
when an object to be recognized is partially out of a field-of-view of a camera that acquired the image, transmit a request to a server to acquire a respective image of the object to be recognized using one or more other cameras.

* * * * *